(12) United States Patent
Doi et al.

(10) Patent No.: US 8,000,315 B2
(45) Date of Patent: Aug. 16, 2011

(54) COMMUNICATION METHOD AND WIRELESS COMMUNICATION DEVICE HAVING A FRAME WHICH IS EXCHANGED BETWEEN NODES

(75) Inventors: Hiroshi Doi, Kanagawa (JP); Masahiro Mimura, Tokyo (JP); Taisuke Matsumoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1050 days.

(21) Appl. No.: 11/815,023

(22) PCT Filed: Jan. 27, 2006

(86) PCT No.: PCT/JP2006/301273
§ 371 (c)(1),
(2), (4) Date: Jul. 30, 2007

(87) PCT Pub. No.: WO2006/080414
PCT Pub. Date: Aug. 3, 2006

(65) Prior Publication Data
US 2009/0052366 A1    Feb. 26, 2009

(30) Foreign Application Priority Data
Jan. 31, 2005    (JP) ................. 2005-022439

(51) Int. Cl.
*H04L 12/28* (2006.01)
*H04W 4/00* (2009.01)
*H04J 3/08* (2006.01)
*H04J 1/10* (2006.01)
*H04B 7/14* (2006.01)

(52) U.S. Cl. .................. 370/351; 370/338; 370/315

(58) Field of Classification Search .................. 370/315, 370/338, 351
See application file for complete search history.

(56) References Cited

U.S. PATENT DOCUMENTS
7,440,414 B2    10/2008    Higashiyama

FOREIGN PATENT DOCUMENTS
JP    2002-247041 A    8/2002
JP    2003-8609 A    1/2003
(Continued)

OTHER PUBLICATIONS

Perkins et al., "Ad-hoc On-Demand Distance Vector Routing", Feb. 1999, Mobile Computing Systems and Applications, 1999, Proceedings, WMCSA '99, Second Workshop on, 90-100.*

(Continued)

*Primary Examiner* — Jinsong Hu
*Assistant Examiner* — Opiribo Georgewill
(74) *Attorney, Agent, or Firm* — RatnerPrestia

(57) ABSTRACT

A frame such as a beacon in wireless communication, with a maximum MAC address, hop count, and maximum hop count, described therein is exchanged between nodes. All the nodes measure the number of hops from a node with the maximum MAC address, and exchange the maximum hop count (hmax) out of the numbers with each other. Hop count $H(a,b)$ between arbitrary nodes $a$ and $b$ is expressed by $H(a,b) \leq H(a,max) + H(max,b) \leq 2*hmax$, where hmax is a hop count from node (max) with the maximum MAC address to the farthest node. That is, the number of hops between two arbitrary nodes in the group is always $2*hmax$ or less. Herewith, a numeric value assuredly exceeding the maximum value out of the numbers of hops between nodes in an ad-hoc network can be propagated in the entire ad-hoc network.

7 Claims, 20 Drawing Sheets

FOREIGN PATENT DOCUMENTS

| | | |
|---|---|---|
| JP | 2003-229869 | 8/2003 |
| JP | 2004-274192 | 9/2004 |
| JP | 2004-282268 | 10/2004 |
| JP | 2005-167675 | 6/2005 |
| JP | 2005-022439 | 6/2010 |

OTHER PUBLICATIONS

Belding-Royer et al., "Ad hoc On-Demand Distance Vector (AODV) Routing", Feb. 2003, IETF Mobile Ad Hoc Networking Working Group.*

Perkins et al., "IP Address Autoconfiguration for Ad Hoc Networks", Nov. 2001, IETF Mobile Ad Hoc Networking Working Group.*

Shinji Motegi et al., "Proposal on Multipath Routing for Ad hoc Networks", vol. 101, No. 717, pp. 111-118, Institute of Electronics Information and Communication Engineers, Mar. 8, 2002.

Kosuke Yamazaki et al., "The Proposal of Reliable Geocast Protocols", vol. 2002, No. 106, pp. 125-130, Information Processing Society of Japan, Nov. 15, 2002.

International Search Report for Application No. PCT/JP2006/301273 dated Apr. 18, 2006.

* cited by examiner

FIG. 17B

| | X | | | Y | | | Z | | |
|---|---|---|---|---|---|---|---|---|---|
| | MAC address | Hop count | Sequence number | MAC address | Hop count | Sequence number | MAC address | Hop count | Sequence number |
| 1 | M | 5 | 23 | M | 6 | 22 | M | 7 | 22 |
| 2 | M | 8 | 23 | M | 8 | 23 | M | 8 | 23 |
| 3 | M | 8 | 23 | M | 8 | 23 | M | 8 | 23 |
| 4 | M | 8 | 23 | M | 8 | 23 | M | 8 | 23 |
| 5 | M | 8 | 23 | M | 8 | 23 | M | 8 | 23 |
| . | | | | | | | | | |
| . | | | | | | | | | |
| 9 | X | 0 | 1 | Y | 0 | 1 | Y | 0 | 1 |

FIG. 18

| | X | | Y | | Z | |
|---|---|---|---|---|---|---|
| | MAC address | Hop count | MAC address | Hop count | MAC address | Hop count |
| 1 | M | 5 | M | 6 | M | 7 |
| 2 | M | ∞ | M | 6 | M | 7 |
| 3 | M | 7 | M | 6 | M | 7 |
| 4 | M | 7 | M | 8 | M | 7 |
| 5 | M | 9 | M | 8 | M | 9 |
| 6 | M | 9 | M | 10 | M | 9 |
| 7 | M | 11 | M | 10 | M | 11 |
| 8 | M | 11 | M | 12 | M | 11 |

1801

COMMUNICATION METHOD AND WIRELESS COMMUNICATION DEVICE HAVING A FRAME WHICH IS EXCHANGED BETWEEN NODES

This application is a U.S. national phase application of PCT international application PCT/JP2006/301273.

TECHNICAL FIELD

The present invention relates to a communication method and a wireless communication device when performing ad-hoc communication in a communication network, particularly in a wireless communication network.

BACKGROUND ART

A wireless network in which plural wireless communication devices composing the network perform ad-hoc communication is described in Japanese Patent Unexamined Publication No. 2003-229869, for example. FIG. 19 illustrates the wireless communication method described in the literature.

In FIG. 19, wireless communication devices 1 through 4 form a wireless network and directly communicate with each other without a control station provided. For example, wireless communication device 2 (1902) transmits management information in which reception timing information indicating a start position for receiving the self information, reception window information, and reception cycle information are described, along with a notification cycle for the management information being set. Wireless communication device 1 (1901) that has successfully received this management information stores the reception timing, reception window, and reception cycle, associating them with the communication device number of the corresponding wireless communication device 2 (1902). Then, wireless communication device 1 (1901), when transmitting information, determines a reception start position for the corresponding wireless communication device 2 (1902) according to the reception timing, reception window, and reception cycle of the other end of communication, and transmits the information at the timing.

Here, every wireless communication device transmits a beacon in management information exchange area (hereinafter, referred to as "beacon period") 1903 in a superframe to exchange management information.

However, as a result that the wireless network moves to which these wireless communication devices 1 through 4 belong, a beacon in a beacon period may collide with another beacon transmitted from a wireless communication device in another wireless network.

If a beacon period thus overlaps that of another wireless network, wireless communication device 1 to 4 determines a beacon period that does not overlap another one, according to offset information received in a beacon period of a group forming another wireless network, and propagates the information to its own wireless network. Then, the wireless communication device 1 to 4 needs to shift to a new beacon period one after another after propagating the information to all the other wireless communication devices in the group.

However, a wireless network with ad-hoc communication is to be distributed-managed and is a network system that establishes itself even if it geographically expands infinitely. Accordingly, it has been difficult to assure that information in a new beacon period is propagated to all the wireless communication devices in the group to which they belong as long as wireless communication device 1 to 4 waits for some counts.

SUMMARY OF THE INVENTION

A purpose of the present invention is to provide a communication method that enables estimating the number of hops or the number of superframes required to propagate information to the entire group of the network, by propagating information by relay method with beacons, and to provide a wireless communication device that implements the method.

The communication method of the present invention is for an ad-hoc network in which plural communication devices perform ad-hoc communication. The communication method of the present invention is performed in the following way. That is, each communication device determines a unique communication device in the ad-hoc network and measures the hop count from the unique communication device. After that, each communication device propagates the maximum hop count, the largest one out of the hop counts, in the ad-hoc network.

With this method, the maximum hop count out of those from the unique communication device to another arbitrary one is propagated over the entire ad-hoc network, thus allowing each communication device to determine the upper limit of the number of hops from an arbitrary node to the farthest communication device using this information.

The communication method of the present invention is that in which a communication device periodically transmits specific information in a communication range that the device can reach.

This method allows plural communication means to transmit specific information to each other synchronously through regular communication.

Specific information according to the communication method of the present invention includes a quantified identifier specifying a communication device. The process for determining a unique communication device according to the communication method of the present invention is as follows. That is, a communication device compares its own identifier as an initial value with that received from another communication device, to select an identifier larger, smaller, or closer to a specific value. After that, the communication device retains the information on the identifier selected and transmits it to another communication device.

This method allows a unique communication device to be specified in the group.

Specific information according to the communication method of the present invention further includes a lifetime indicating how long the specific information is valid. When the lifetime of a communication device timeouts, the communication device deletes the information on the identifier received and then determines a unique communication device again.

This method causes a communication device to delete old information when its lifetime elapses even if the network topology changes, thus allowing the communication device to respond to the change dynamically.

Specific information according to the communication method of the present invention includes a hop count from a unique communication device. The process for measuring a hop count from a unique communication device, according to the communication method of the present invention is executed as follows. That is, a unique communication device transmits the hop count included in the specific information starting with '0'. After that, the communication device, when receiving the specific information, adds a given number of hops to the hop count. Then, the communication device compares the hop count with the given number of hops added, to the information on the hop count from the unique communication device, retained until then, and selects the smaller hop count. After that, the communication device updates the information on the hop count included in the specific information, to the hop count selected before, and transmits it to another communication device.

This method allows measuring the hop count according to a given number of hops from a unique communication device, through regular communication.

Specific information according to the communication method of the present invention includes an identifier specifying a communication device; a hop count from a unique communication device; and a lifetime created by unifying the lifetime of the identifier information and that of the hop count information. The process for determining a unique communication device, according to the communication method of the present invention is executed as follows. That is, a communication device compares its own identifier as an initial value to that received from another communication device, and selects an identifier larger, smaller, or closer to a specific value. Then, the communication device retains the information on the identifier selected and transmits it to another communication device.

The process for measuring a hop count, according to the communication method of the present invention is executed as follows. That is, a unique communication device transmits a hop count included in the specific information starting with '0'. Then, the communication device, when receiving the specific information, adds a given number of hops to the hop count. After that, the communication device compares the hop count with the given number of hops added, to the information on the hop count from the unique communication device, retained until then, and selects the smaller hop count. Then, the communication device updates the information on the hop count included in the specific information to the hop count selected before, and transmits it to another communication device. Further, the communication device, when the lifetime elapses, deletes the identifier information and the hop count information, received.

This method allows reducing the amount of protocol data carried by specific information and simplifying the algorithm of the communication method of the present invention.

Specific information according to the communication method of the present invention includes a maximum hop count. The process for propagating the maximum hop count out of the hop counts retained by individual communication devices, in the ad-hoc network is executed as follows. That is, the communication device compares the hop count from the unique communication device, acquired from the measuring process; the maximum hop count received; and the information on the maximum hop count retained until then, and selects the maximum hop count. Then, the communication device updates the information on the maximum hop count to that selected by the self, and transmits it to another communication device.

This method allows a communication device to propagate the maximum hop count out of those of the other communication devices, in the ad-hoc network.

The wireless communication method of the present invention determines the lifetime as (time required for 1-hop relaying)*(k+n), assuming that the value of the maximum hop count is k (n is a constant).

This expression allows the communication device to determine an initial value of the lifetime. Further, the upper limit of the maximum number of hops from a communication device with the maximum MAC address is k, and thus the communication device assuredly distributes each specific information to the entire group before timeouting, as well as reduces the timeout value.

The communication method of the present invention determines the lifetime as (time required for 1-hop relaying)*(mk+n), assuming that the value of the maximum hop count is k (m and n are constants).

This expression allows the communication device to advertise the maximum hop count to all the communication devices in the group, assuming that m is 2, for example.

The communication method of the present invention determines the lifetime as (time required for 1-hop relaying)*(k+n) when the network is in a contracting or steady state; and as (time required for 1-hop relaying)*(mk+n) when the ad-hoc network is expanding.

This method allows the communication device to dynamically respond to expansion/contraction of the network gradually changing, thus always specifying an optimum lifetime.

The communication method of the present invention, when receiving specific information that increases the maximum hop count, at least once during a period twice the cycle during which the communication device communicates specific information periodically, judges the ad-hoc network expanding; otherwise, contracting or steady.

This method allows defining the concept of expansion/contraction in an actual network.

The communication method of the present invention has a step for recording the identifier of a communication device as the transmission origin of specific information when the communication device updates the identifier of the unique communication device, the hop count from the unique communication device, and the maximum hop count, respectively; and a step for unconditionally updating the information on the identifier of the unique communication device, the hop count from the unique communication device, and the maximum hop count when the communication device receives specific information from a communication device with the identifier conforming to that recorded.

These steps allow the communication device to rapidly update changes occurring upstream on a unique wireless communication device and a communication device advertising the maximum hop count, independently of the lifetime change.

Specific information according to the communication method of the present invention further includes sequence numbers given to the identifier of a unique communication device, the hop count from the unique communication device, and the maximum hop count, respectively. If the sequence number included in specific information received is smaller than that retained by the self, the communication device invalidates the specific information.

This method allows a communication device to prevent data such as the identifier of a unique communication device, hop count, and maximum hop count, to be overwritten with old information, and thus the communication device can respond to problems such as counting infinity.

The communication method of the present invention is that in which a sequence number given to the identifier of a unique communication device and that given to the maximum hop count are unified.

This method allows reducing the amount of protocol data carried by specific information and simplifying the algorithm of the communication method of the present invention.

The wireless communication device of the present invention includes a frame receiving unit that extracts a frame; a specific information extracting unit; a recording unit; a selecting unit; a hop counting unit; a maximum hop count determining unit; and a frame transmitting unit. Here, the specific information extracting unit extracts from a frame, an identifier specifying a unique wireless communication device, the hop count from the unique wireless communication device, and the maximum hop count that is the largest one out of the hop counts. The recording unit records the identifier, hop count, and maximum hop count. The selecting unit selects a unique wireless communication device according to an identifier extracted by the specific information extracting unit and that recorded in the recording unit. The hop counting unit determines the minimum hop count out of the hop counts from the wireless communication device selected by this selecting unit. The maximum hop count determining unit determines the maximum hop count according to the maximum hop count extracted by the specific information extracting unit, the maximum hop count recorded in the recording unit, and the hop count determined by the hop counting unit, and updates the maximum hop count in the recording unit. The frame transmitting unit generates a frame having specific information including the identifier of a wireless communication device selected by the selecting unit, the hop count determined by the hop counting unit, and the maximum hop count determined by the maximum hop count determining unit, and transmits the frame.

This makeup allows the wireless communication device to eventually determine a unique wireless communication device and to propagate the maximum hop count out of those from the unique wireless communication device to an arbitrary wireless communication device, in an ad-hoc network. Accordingly, the wireless communication device can determine the upper limit of the number of hops from an arbitrary node to the farthest wireless communication device.

A frame with which the wireless communication device of the present invention transmits specific information is a beacon.

This makeup allows implementing a device for exchanging specific information through a beacon of a wireless communication device.

As described above, according to the present invention, the minimum count of hops can be determined required for propagating information from an arbitrary node to all the other nodes. Accordingly, nodes in a group forming an ad-hoc network can determine the minimum number of times and time period for which propagation of timing data of a protocol event requiring synchronization and the like must be continued.

BRIEF DESCRIPTION OF DRAWINGS

FIG. 17B illustrates transition of the maximum MAC address, hop count, and sequence number of each node, according to the embodiment of the present invention.

FIG. 18 illustrates transition of the maximum MAC address, hop count, and sequence number of each node, according to the embodiment.

REFERENCE MARKS IN THE DRAWINGS

Figure 1:
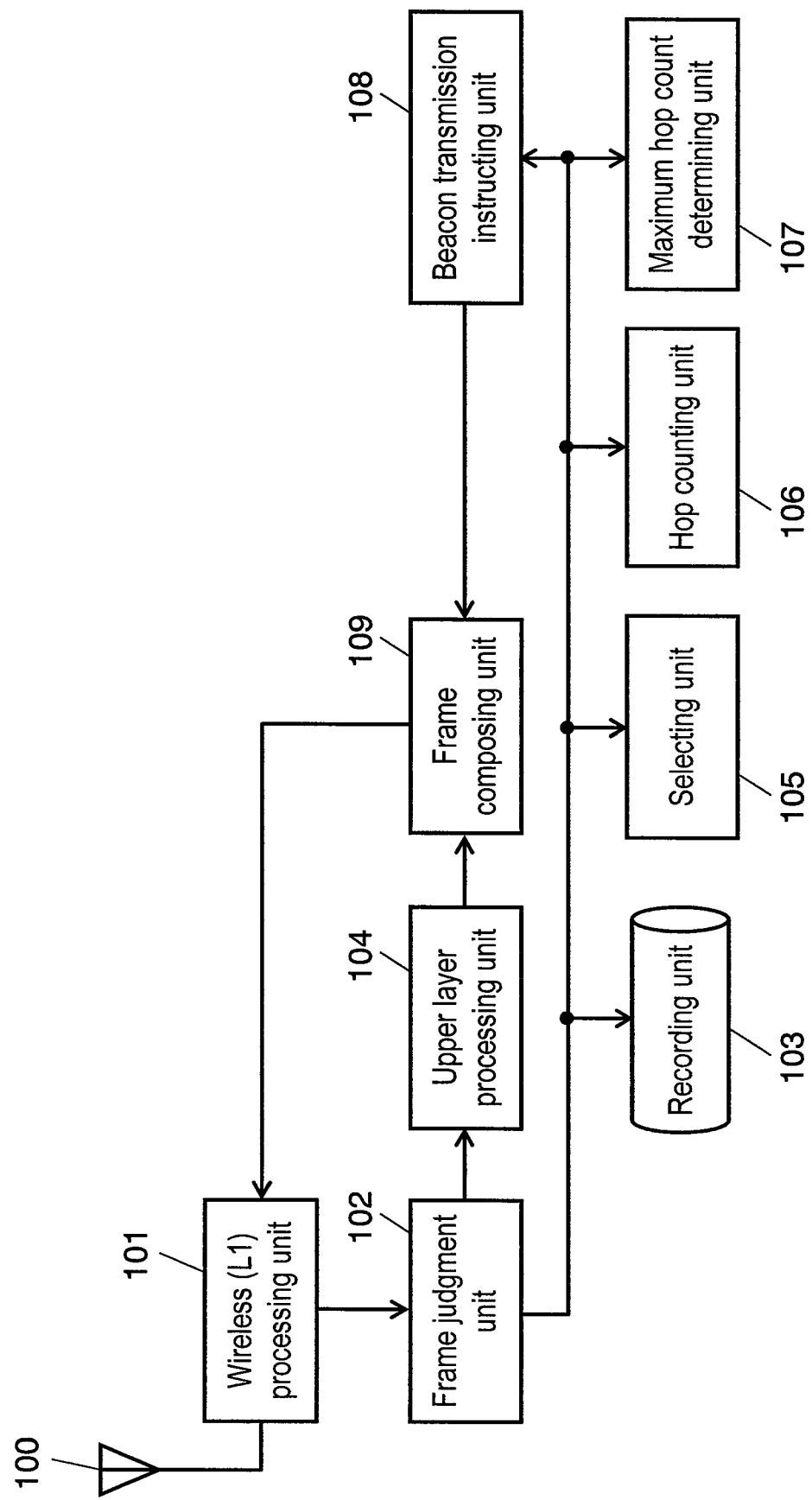
FIG. 1 is a block diagram illustrating the makeup of a wireless communication device according to the embodiment of the present invention.

41 Node A
42 Node B
43 Node C
44 Node D
45 Node E
46 Node F
47 Node G
48 Node X
49 Node H
51, 52, 53, 54, 1201 through 1205, 1301 Node
100 Antenna
101 Wireless (L1) processing unit
102 Frame judgment unit
103 Recording unit
104 Upper layer processing unit
105 Selecting unit
106 Hop counting unit
107 Maximum hop count determining unit
108 Beacon transmission instructing unit
109 Frame composing unit
1901 Wireless communication device 1
1902 Wireless communication device 2

DETAILED DESCRIPTION OF PREFERRED EMBODIMENT

Hereinafter, a description is made for the embodiment of the present invention using the related drawings.

FIG. 1 is a block diagram illustrating the makeup of a wireless communication device (node) according to the embodiment.

In FIG. 1, wireless (L1) processing unit 101 converts an analog signal received by antenna 100 to a digital signal, generates a frame, converts the frame to an analog signal, and sends it out from antenna 100. This antenna 100 is nondirectional and emits radio waves. This wireless (L1) processing unit 101 corresponds to the frame receiving unit according to the present invention.

Frame judgment unit 102 judges whether a frame received by wireless (L1) processing unit 101 is a beacon frame or a data frame. This frame judgment unit 102 corresponds to the specific information extracting unit according to the present invention. In this embodiment, in order to measure the maximum number of hops or the number of superframes required for distributing information in the group, a beacon frame including a data field (referred to as "measurement frame" hereinafter) is used.

Figure 2:
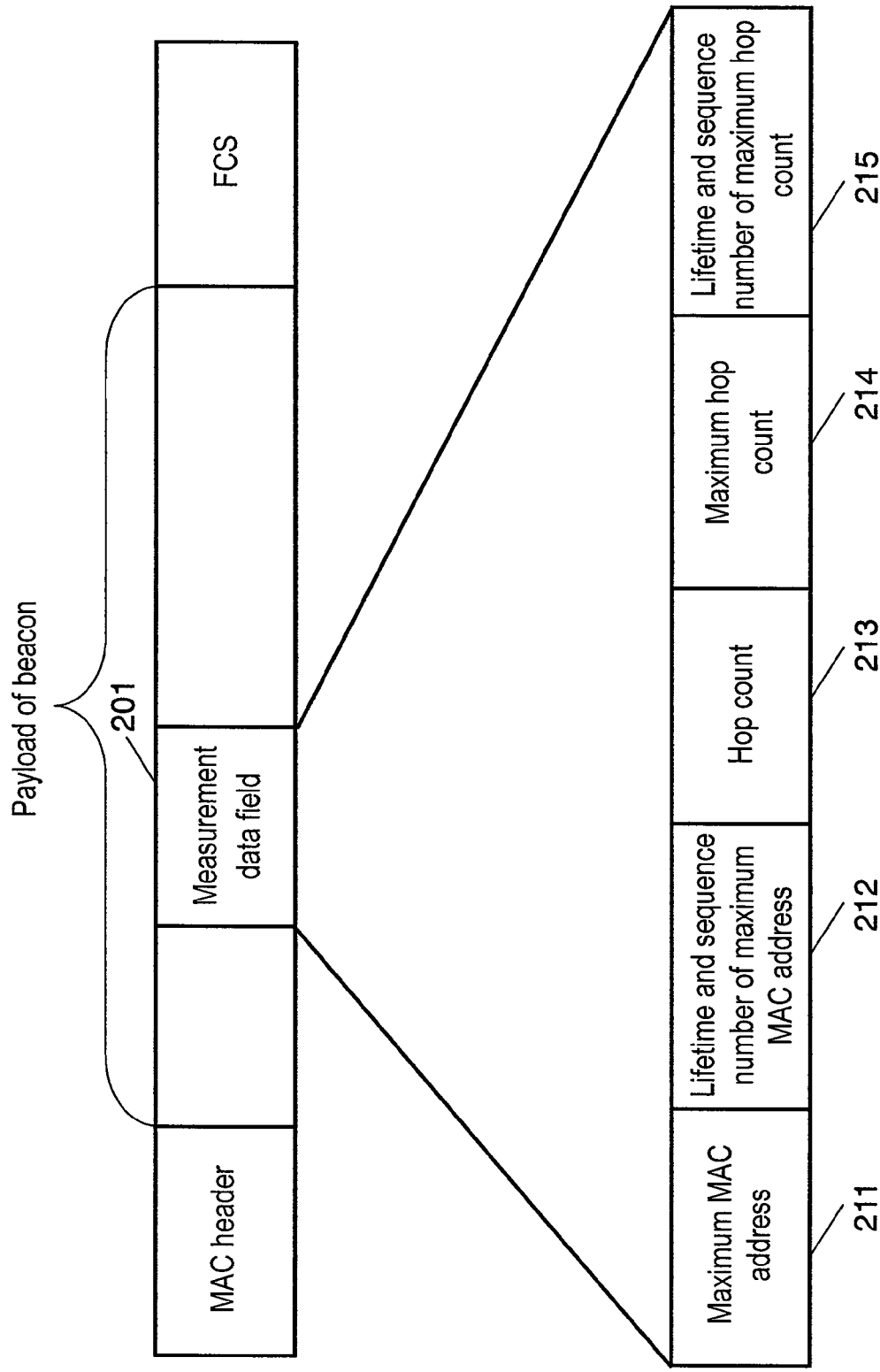
FIG. 2 is a block diagram of a measurement frame according to the embodiment of the present invention.

FIG. 2 illustrates the makeup of the measurement frame.

In FIG. 2, measurement data field 201 is an area where data used to measure the size (the maximum number of hops or the number of superframes) of the group to which the wireless communication device belongs to. This measurement data field 201 is composed of maximum MAC address 211, the lifetime and sequence number 212 of the maximum MAC address, hop count 213, maximum hop count 214, and the lifetime and sequence number 215 of the maximum hop count.

Maximum MAC address 211 shows the MAC address of a wireless communication device that the wireless communication device as the transmission origin of this measurement frame acknowledges as the maximum in the group. The lifetime and sequence number 212 of the maximum MAC address show the current lifetime and the sequence number of the measurement frame transmitted from the wireless communication device with the maximum MAC address, respectively. Hop count 213 shows the number of hops from the wireless communication device as the transmission origin of this measurement frame to the wireless communication device acknowledged as having the maximum MAC address. Maximum hop count 214 shows the hop count that the wireless communication device as the transmission origin of this measurement frame acknowledges as the maximum out of those from wireless communication devices including the self to the wireless communication device with the maximum MAC address. The lifetime and sequence number 215 of the maximum hop count show a lifetime required to propagate to all the wireless communication devices in the group, and a sequence number used to transmit the maximum hop count, respectively.

In this embodiment, the lifetime and sequence number of hop count 213 can be replaced by the lifetime of the maximum MAC address and sequence number 212, respectively. This is because maximum MAC address information and hop count information are formed by information on a transmitter (wireless communication device) with the same maximum MAC address being relayed, and whether the information is old or new can be determined by whether the transmitter is the same or not.

Recording unit 103 records a maximum MAC address that is acknowledged as the maximum MAC address out of the information described in the measurement frame received; the current lifetime and sequence number of the measurement frame carrying the maximum MAC address; the hop count when receiving the measurement frame; and the maximum hop count to the wireless communication device with the maximum MAC address.

Upper layer processing unit 104 executes a protocol process for a network layer or higher.

Selecting unit 105 selects a wireless communication device satisfying a selection condition preliminarily specified. In this embodiment, the condition is to be preliminarily defined that a wireless communication device with the maximum MAC address is to be a unique wireless communication device.

Hop counting unit 106 measures the hop count from a wireless communication device selected by selecting unit 105 to the self to determine a minimum hop count.

Maximum hop count determining unit 107 determines the maximum hop count out of a hop count measured by hop counting unit 106 and a hop count from a wireless communication device selected by selecting unit 105 to the self.

Beacon transmission instructing unit 108 generates the lifetime and sequence number of data retransmitted to a neighbor wireless communication device, created by selecting unit 105, hop counting unit 106, and maximum hop count determining unit 107.

Frame composing unit 109 generates a frame by adding a header, FCS (frame check sequence), and like. Beacon transmission instructing unit 108 and frame composing unit 109 correspond to the frame transmitting unit of the present invention.

Hereinafter, a description is made for the operation of a wireless communication device with the above-described makeup.

In FIG. 1, a reception frame delivered from wireless (L1) processing unit 101 is screened by frame judgment unit 102, and if the frame is an ordinary communication frame, it is delivered to upper layer processing unit 104. Inversely, a transmission frame delivered from upper layer processing unit 104 is delivered to frame composing unit 109, and after a header and the like are formed, the frame is communicated by wireless (L1) processing unit 101.

If frame judgment unit 102 screens a measurement frame, recording unit 103 stores parameters used by the protocol of the present invention, and internal data (flag, MAC address). Then, selecting unit 105, hop counting unit 106, maximum hop count determining unit 107, and beacon transmission instructing unit 108 form retransmission data using the data in recording unit 103, and then the retransmission data with a header, FCS, and the like added by frame composing unit 109 is wirelessly transmitted from wireless (L1) processing unit 101.

Hereinafter, a description is made for the operation when a wireless communication device (node) according to the embodiment receives a measurement frame.

Figure 3:
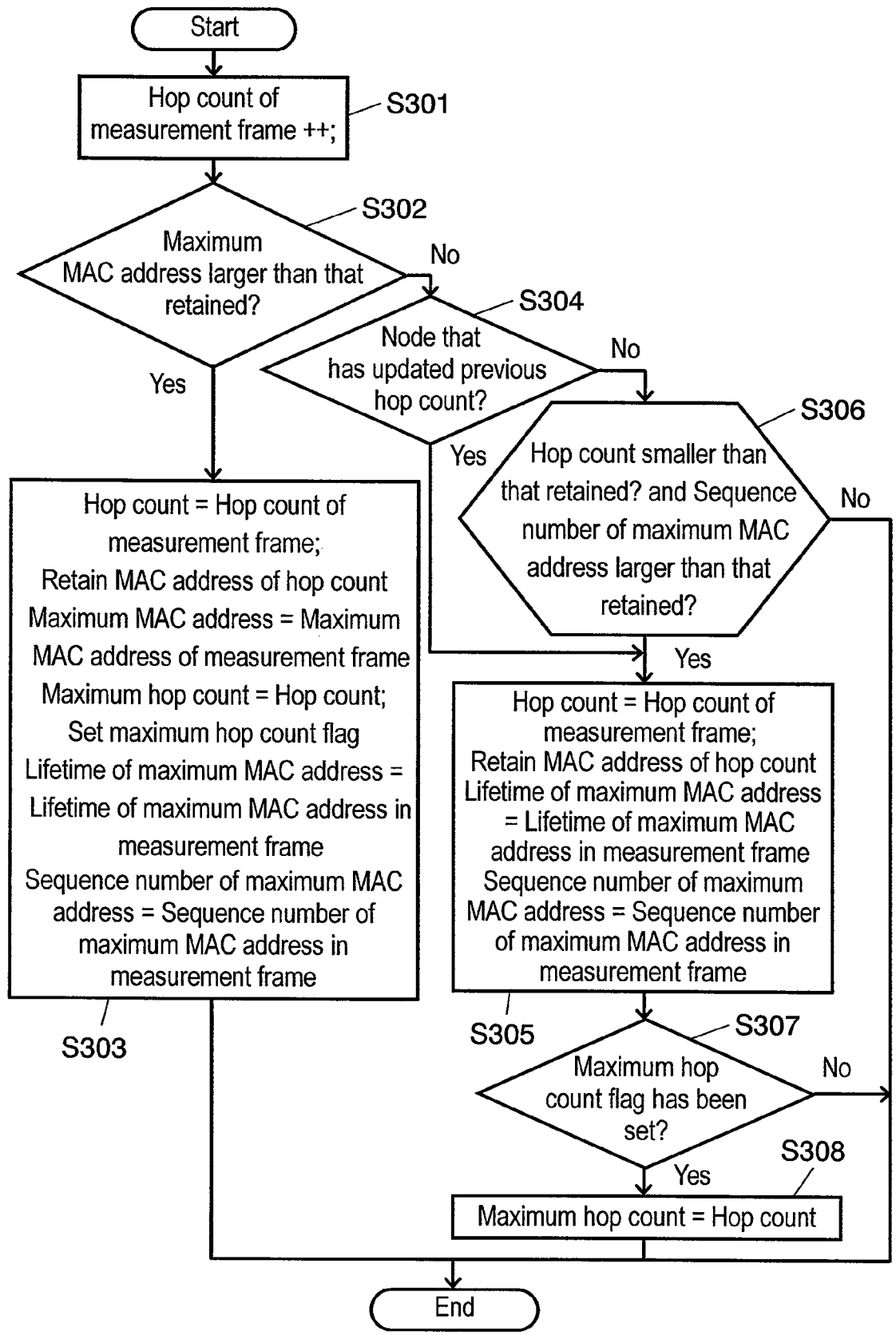
FIG. 3 is a flowchart illustrating a process for creating retransmission data, according to the embodiment of the present invention.

FIG. 3 is a flowchart illustrating a process for creating retransmission data, that selecting unit 105, hop counting unit 106, maximum hop count determining unit 107, and beacon transmission instructing unit 108 execute when wireless (L1) processing unit 101 receives a measurement frame.

In FIG. 3, first, hop counting unit 106 adds '1' to the hop count in the measurement frame (step S301).

Next, selecting unit 105 judges whether maximum MAC address 211 in the measurement frame is larger than the maximum MAC address stored in recording unit 103 (step S302). If larger, selecting unit 105 updates the maximum MAC address and hop count recorded in recording unit 103 to those in the measurement frame. Additionally, selecting unit 105 retains the MAC address of the node that has updated the hop count recorded, in recording unit 103. Maximum hop count determining unit 107 temporarily updates the maximum hop count recorded in recording unit 103, to the self hop count added in step S301, and sets the maximum hop count flag (F) (step S303). This maximum hop count flag indicates that the self is an information provider of the maximum hop count. Beacon transmission instructing unit 108, if the flag has been set, sets values on the basis of the self management information, to the lifetime and sequence number 215 of the maximum hop count in the measurement frame. This management information includes the lifetime of data transmitted by the self and a sequence number sequentially given to a transmission frame.

Meanwhile, in step S302, if maximum MAC address 211 in the measurement frame is not larger than the maximum MAC address stored in recording unit 103, namely if a maximum MAC address has been retained in recording unit 103 already, selecting unit 105 judges whether or not the measurement frame has been received from a node that has updated the previous hop count (step S304).

If the transmission origin of the measurement frame is a node that has performed the previous update, hop counting unit 106 updates the hop count to that added in step S301. At this moment, even if the hop count is at its maximum, hop counting unit 106 overwrites the hop count. This is because, when the node that has performed the previous update reports a value more undesirable than the previous one due to a deteriorated hop count or a disconnected link, the node needs to wait for a timeout of the old information to update to new information unless the node updates the hop count. Beacon transmission instructing unit 108 updates the lifetime and sequence number of the maximum MAC address as well, to the lifetime and sequence number 212 of the maximum MAC address in the measurement frame (step S305). Then, maximum hop count determining unit 107 judges whether or not the maximum hop count flag has been set (step S307), and if set, updates the maximum hop count to the self hop count added in step S301 (step S308).

Meanwhile, if the measurement frame is not that from a node that has performed the previous update, maximum hop count determining unit 107 judges whether or not the sequence number of the maximum MAC address is large (new), and additionally the hop count is smaller than that retained (step S306). Then, if the condition is met, the process flow shifts to step S305, and hop counting unit 106 updates the information retained in recording unit 103 to that in the measurement frame. After that, maximum hop count determining unit 107, if the maximum hop count flag has been set, updates the maximum hop count to that counted by the self.

Figure 4:
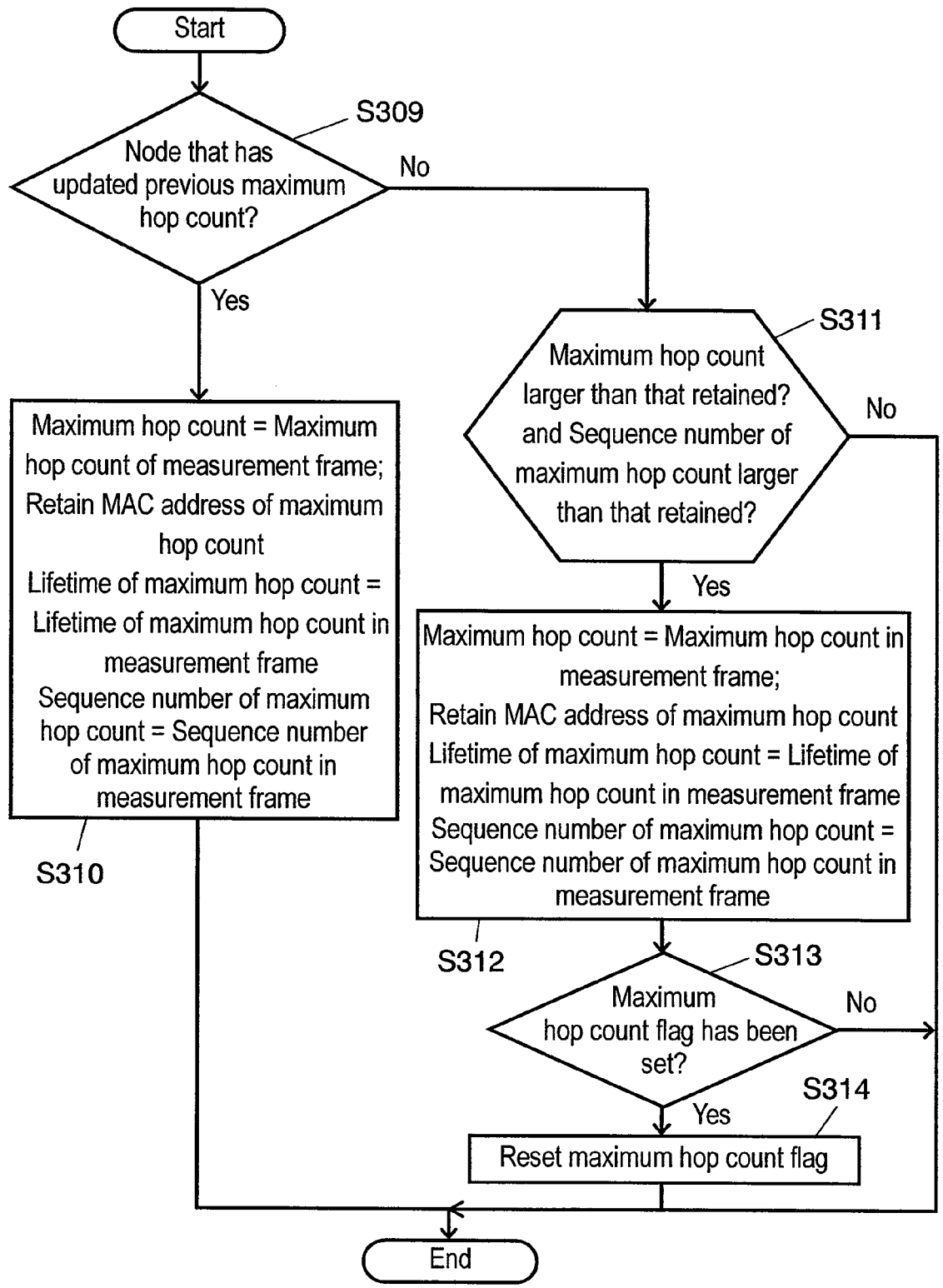
FIG. 4 is a flowchart illustrating a process for comparing the maximum hop count, according to the embodiment of the present invention.

After the above-described process of steps S301 through S308, a process for comparing the maximum hop count shown in FIG. 4 is executed.

The process for comparing the maximum hop count in FIG. 4 is roughly the same as that for comparing the hop count of steps S304 through S308 shown in FIG. 3.

First, selecting unit 105 judges whether or not the measurement frame received is that from a node that has performed the previous update (step S309), and if so, maximum hop count determining unit 107 unconditionally updates the maximum hop count recorded in recording unit 103, to maximum hop count 214 in the measurement frame (step S310). Beacon transmission instructing unit 108 updates the lifetime and sequence number of the maximum hop count, to the lifetime and sequence number 215 of the maximum hop count described in the measurement frame. Selecting unit 105 retains the MAC address of the maximum hop count, in recording unit 103.

Meanwhile, if the measurement frame received is not that from a node that has performed the previous update, selecting unit 105 judges whether or not the sequence number of the maximum hop count is large (new), and additionally the maximum hop count is larger than that retained in recording unit 103 (step S311). Then, if the condition is met, beacon transmission instructing unit 108 updates the maximum hop count, the lifetime and the sequence number of the maximum hop count, retained in recording unit 103, to respective information in the measurement frame. Then, if the maximum hop count flag has been set (step S313), maximum hop count determining unit 107 resets the flag (step S314).

The above-described operation is summarized as follows.
1. Each node sets the self MAC address as the initial value of maximum MAC address 211 in the measurement frame, and periodically transmits it along with its lifetime and sequence number.
2. Each node periodically transmits the initial value of hop count 213 as '0', indicating that the self address is the maximum MAC address. Each node retains information on the hop count from a node that assumes the maximum MAC address is the self address, and if receiving protocol data smaller than the hop count retained, updates the hop count. Then, each node periodically advertises the hop count, assuming it is retained by the self. Here, each node does not update according to protocol data with an old sequence number.
3. Each node retains the initial value of the information on the maximum hop count as '0', indicating that the self address is the maximum MAC address. This data is given a lifetime and sequence number different from those of a maximum MAC address and a hop count, and is updated and maintained by a node that acknowledges the self address is the maximum MAC address. This data is periodically advertised by each node as well, and each node, when receiving a larger maximum hop count, updates the maximum hop count in recording unit 103 and retransmits it. Here, each node does not update the maximum hop count according to protocol data with an old sequence number.
4. When the lifetime of the maximum MAC address timeouts, each node executes the process described in 1 through 3 above again, with the maximum MAC address, hop count, and maximum hop count, returned to their initial values.
5. When the lifetime of the maximum hop count timeouts, each node executes the process described in 3 above again, with the self hop count being the maximum hop count.
6. Even if the values of the hop count and maximum hop count are not suitable for updating, each node updates the hop count and maximum hop count if the measurement frame is that from a node that has performed the previous update.
7. Even if the values of the hop count and maximum hop count are suitable for updating, each node does not update the hop count and maximum hop count if the sequence number in the measurement frame is old.

Next, a description is made for the operation for measuring the group size in a case where plural wireless communication devices (nodes) operating as described above form one group, using the related drawings.

FIGS. 5 through 12 illustrate transition of information in a measurement frame propagated with relay method, from an initializing state to a steady state of each wireless communication device according to the embodiment. Here, three pieces of data 401 through 403 written to node A(41) show a maximum MAC address, hop count, and maximum hop count, respectively. This notational convention applies to the other nodes as well.

Figure 5:
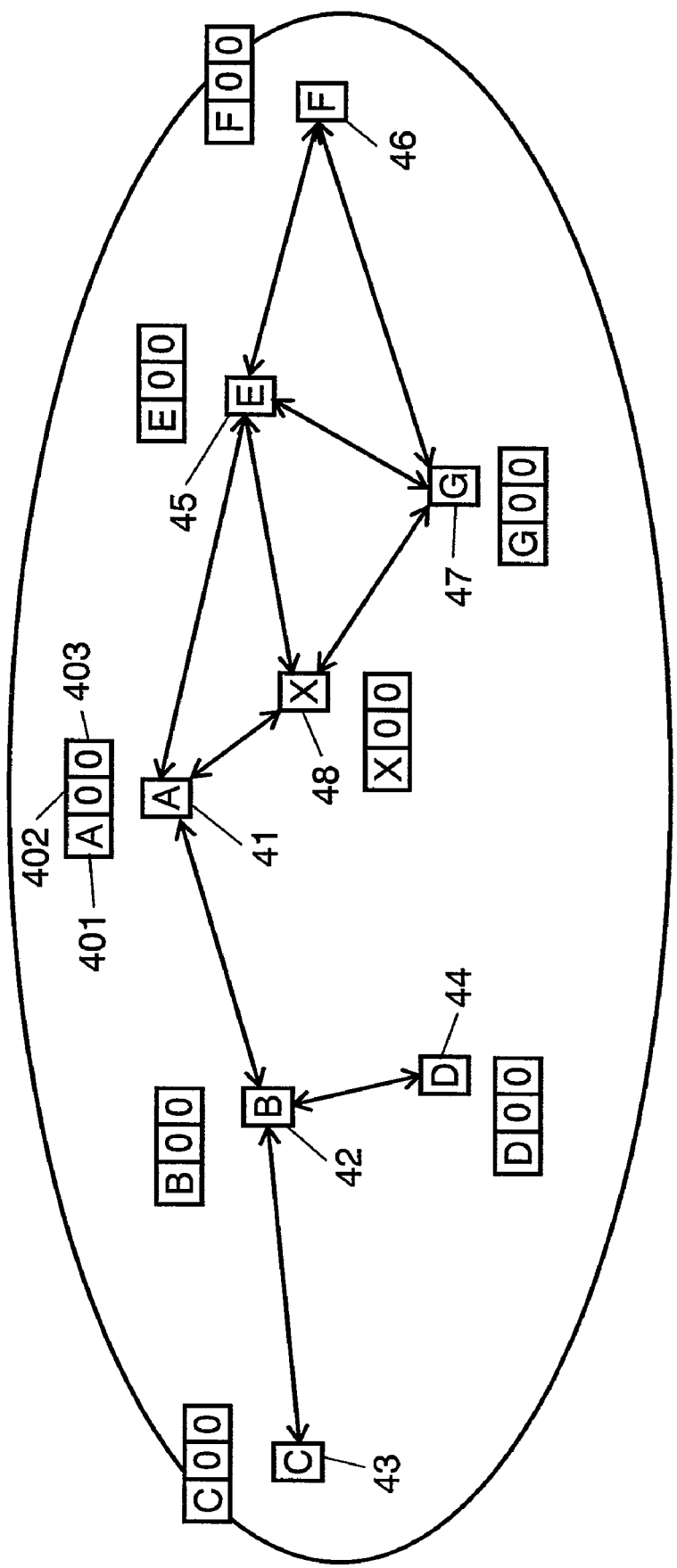
FIG. 5 is illustrates network operation performed by each wireless communication device, according to the embodiment of the present invention.

In FIG. 5, wireless communication device (node) A(41) can communicates with nodes B(42), E(45), X(48); node B(42), with nodes A(41), C(43), D(44); node C(43), with node B(42) only; node D(44), with node B(42) only; node E(45), with nodes A(41), F(46), G(47), X(48); node F(46), with nodes E(45), G(47); node G(47), with nodes E(45), F(46), X(48); and node X(48), with nodes A(41), E(45), G(47).

Here, the wireless network described in this embodiment is an ad-hoc network autonomously formed, capable of communicating with a neighbor node.

First, the information in a measurement frame transmitted by node A(41)-G(47), or X(48) indicates maximum MAC address 401=self MAC address, hop count 402=0, maximum hop count 403=0 at initialization (described as (A,0,0) hereinafter), where the MAC address of each node is assumed to be given in ascending alphabetical order.

Figure 6:
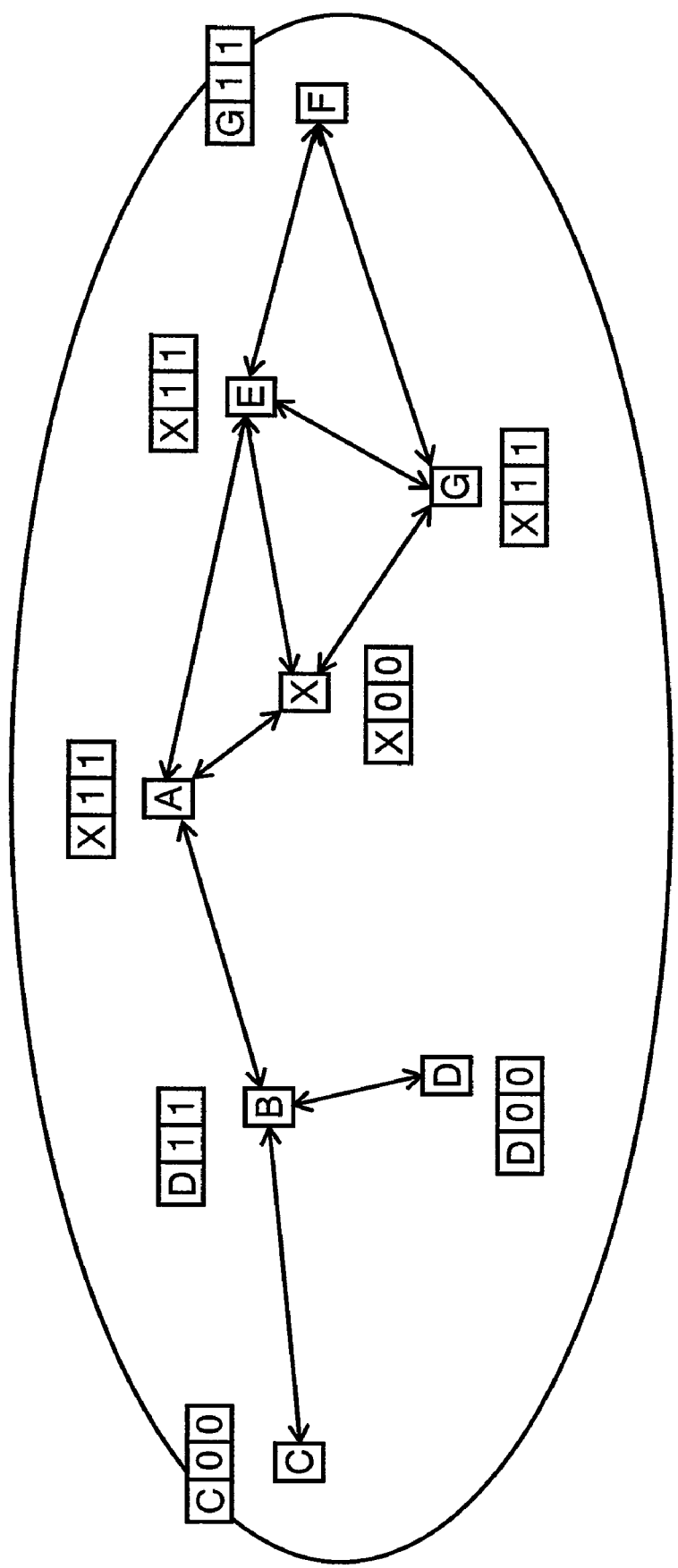
FIG. 6 is illustrates network operation performed by each wireless communication device, according to the embodiment of the present invention.

Next, in FIG. 6, node B regards maximum MAC address 211 in a measurement frame from node D out of those received from communicable nodes A, C, D, as the maximum; saves (D,1,1); and retransmits it to nodes A, C, D. Similarly, node F regards the maximum MAC address in a transmission frame from node G as the maximum; saves (G,1,1); and retransmits it. Nodes A, E, G regards the maximum MAC address in a transmission frame from node X as the maximum; saves (X,1,1); and retransmits it. Nodes C, X acknowledge their addresses as the maximum MAC address, and thus retain the state same as at initialization and retransmit the self MAC address.

Figure 7:
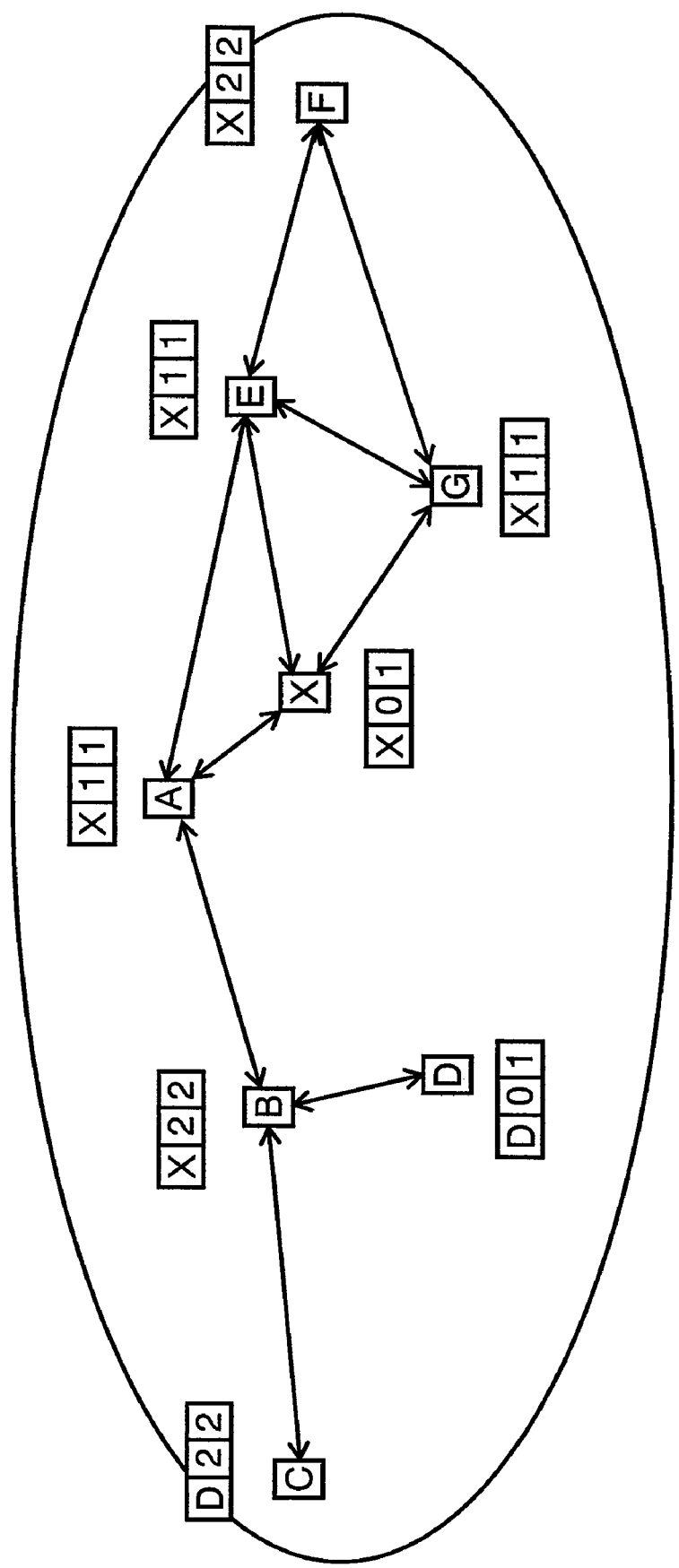
FIG. 7 is illustrates network operation performed by each wireless communication device, according to the embodiment of the present invention.

Next, in FIG. 7, nodes B, F acknowledge the address of node X as the maximum MAC address according to measurement frames newly received from nodes A, E; update the recorded data to (X,2,2); and retransmit this information. At this moment, the hop count and maximum hop count respectively become '2' because they are transmitted by nodes A, E with their values increased by one. Node C updates the recorded data to (D,2,2) according to information from node B. Node D receives the maximum hop count from node B and updates the recorded data to (D,0,1). Node X receives the maximum hop count from one of nodes A, E, G and updates the recorded data to (X,0,1).

Figure 8:
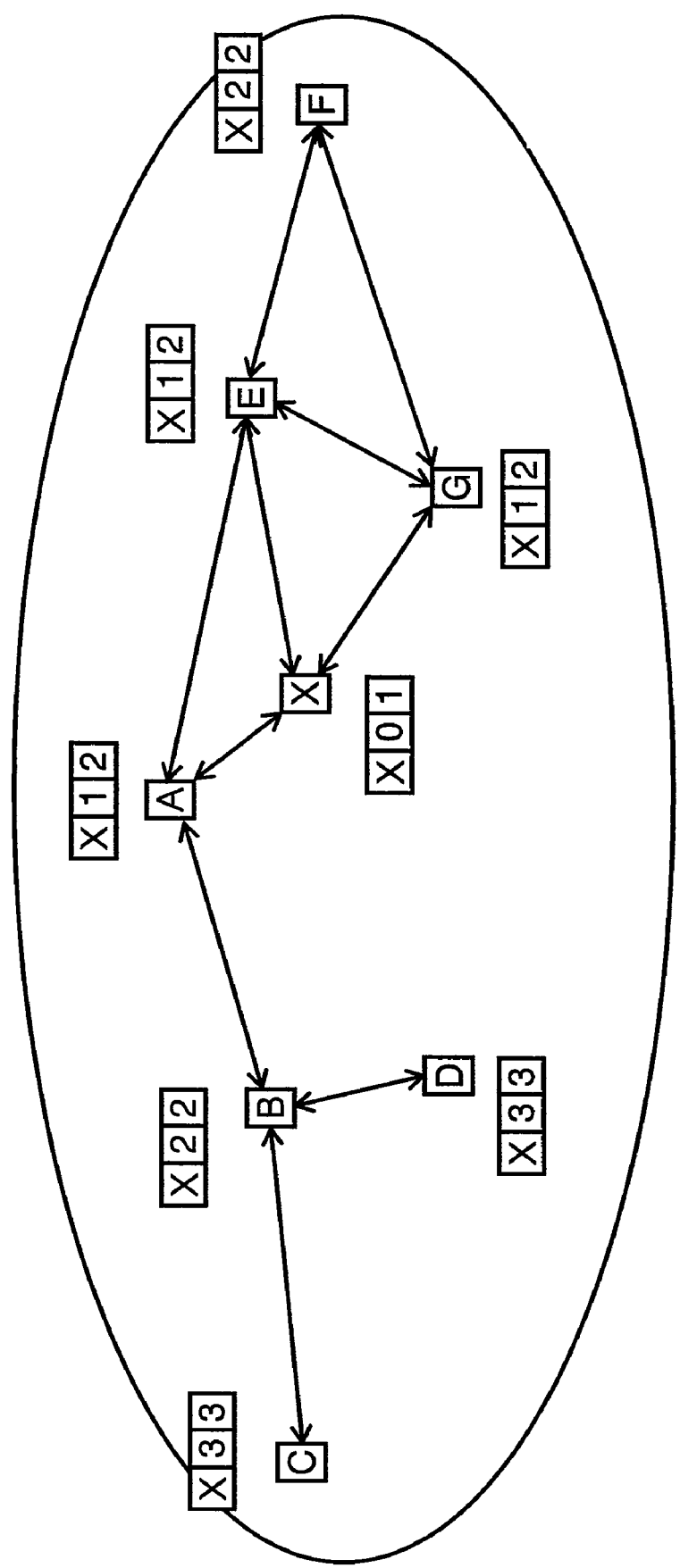
FIG. 8 is illustrates network operation performed by each wireless communication device, according to the embodiment of the present invention.

Next, in FIG. 8, nodes C, D acknowledge the MAC address of node X as the maximum MAC address and updates the recorded data to (X,3,3). The maximum hop count recorded by nodes A, E, G is updated to '2' according to information in the measurement frame received from nodes B, F.

Figure 9:
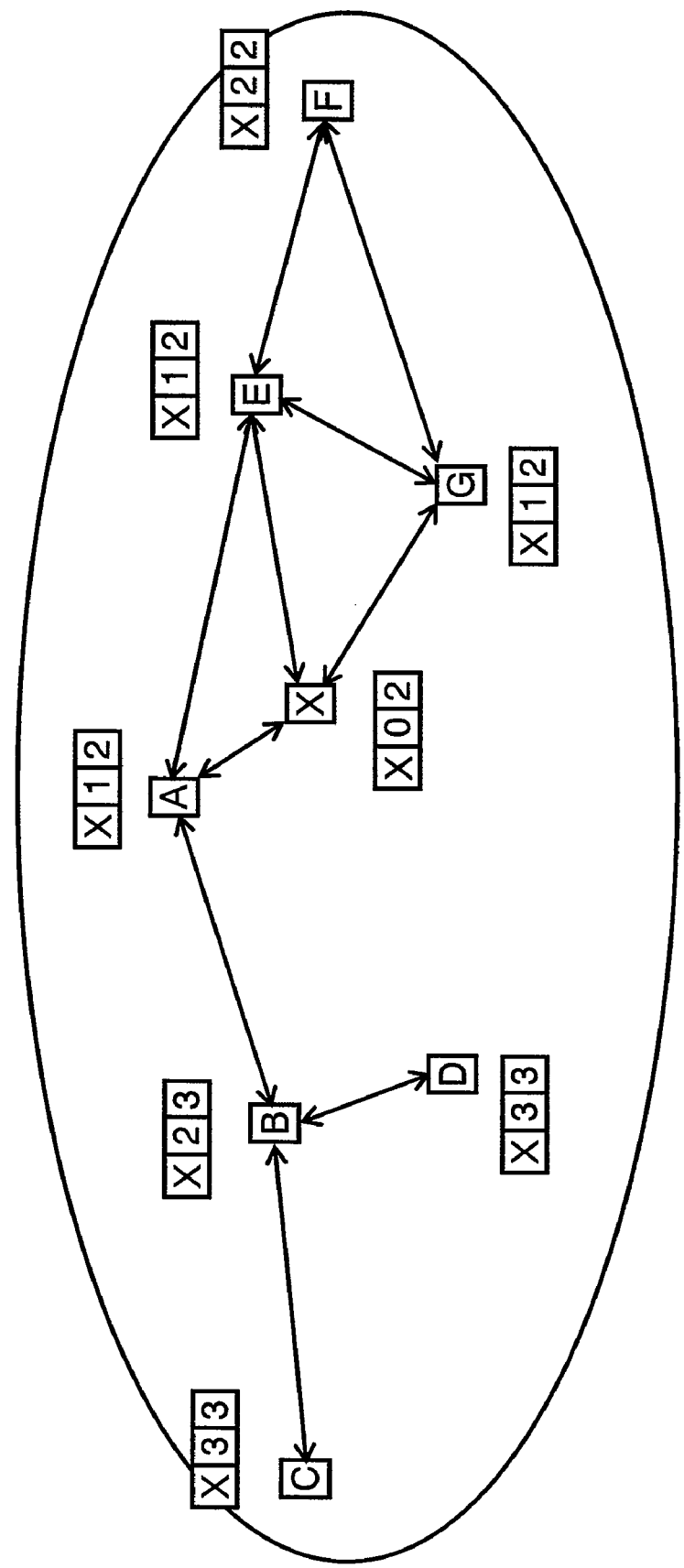
FIG. 9 is illustrates network operation performed by each wireless communication device, according to the embodiment of the present invention.

Next, in FIG. 9, the maximum hop count is updated to '3' at node B, which is information in the measurement frame received from nodes C, D, and becomes '2' at node C according to information from nodes A, E, G.

Figure 10:
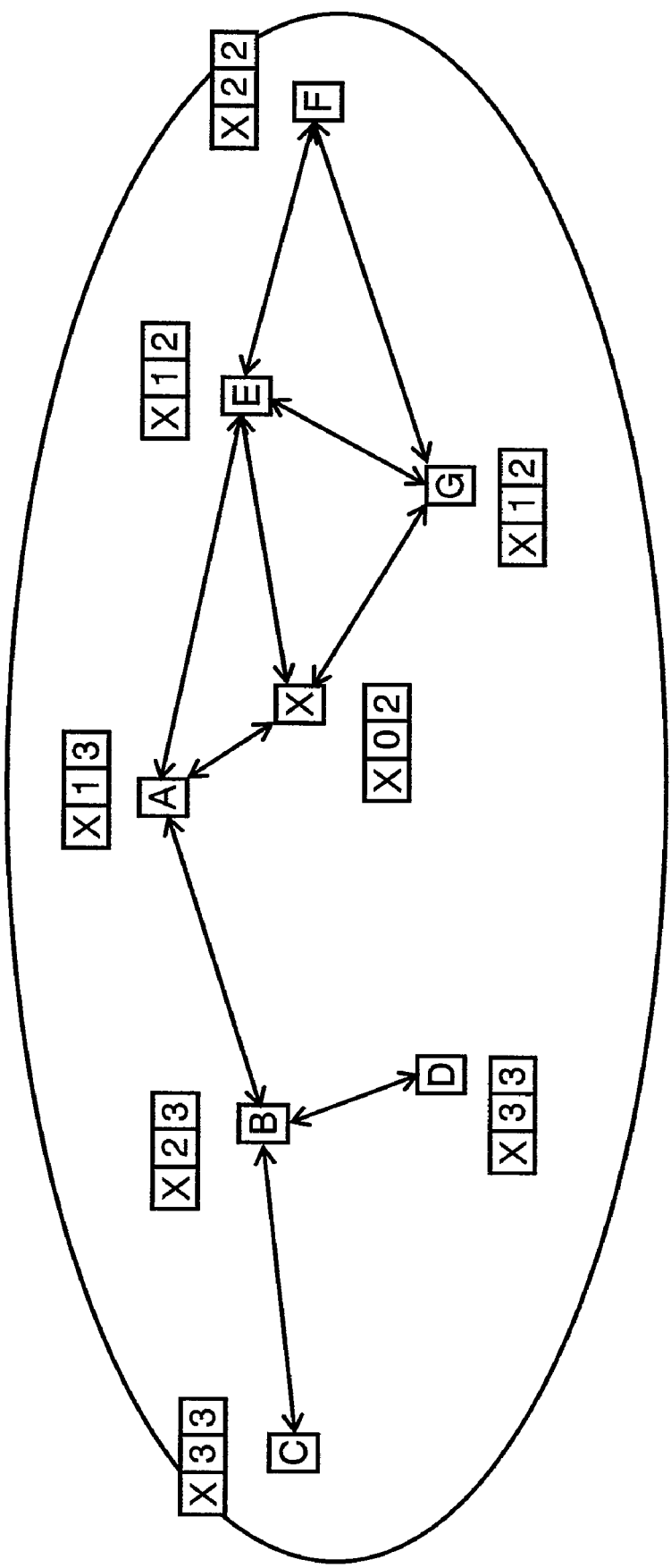
FIG. 10 is illustrates network operation performed by each wireless communication device, according to the embodiment of the present invention.

Next, in FIG. 10, node A updates the maximum hop count recorded to '3' according to information in the measurement frame received from node B, and additionally retransmits a measurement frame including the maximum hop count updated, to node E, X.

Figure 11:
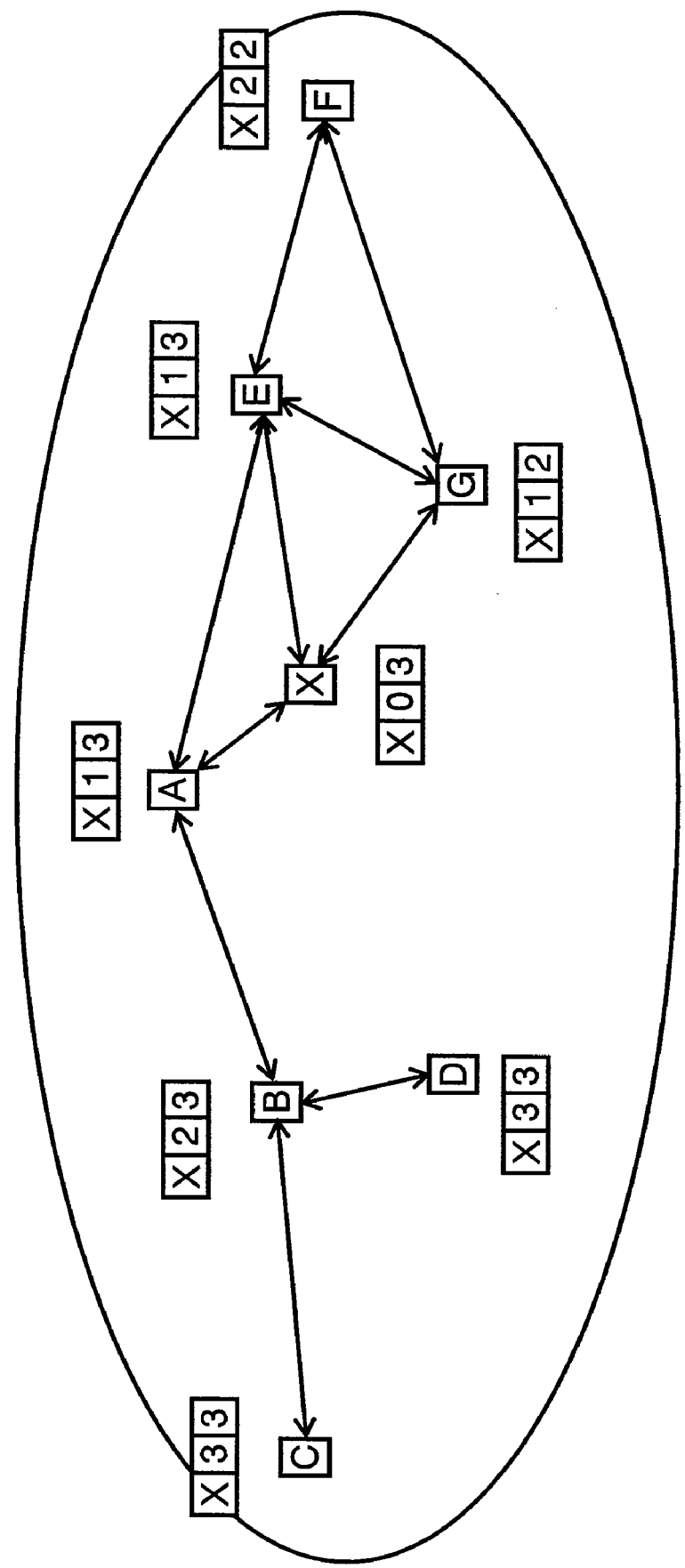
FIG. 11 is illustrates network operation performed by each wireless communication device, according to the embodiment of the present invention.

Next, in FIG. 11, nodes E, X update the recorded maximum hop count to '3' according to information in the measurement frame received from node A, and additionally retransmit a measurement frame including the maximum hop count updated, to node G, F.

Figure 12:
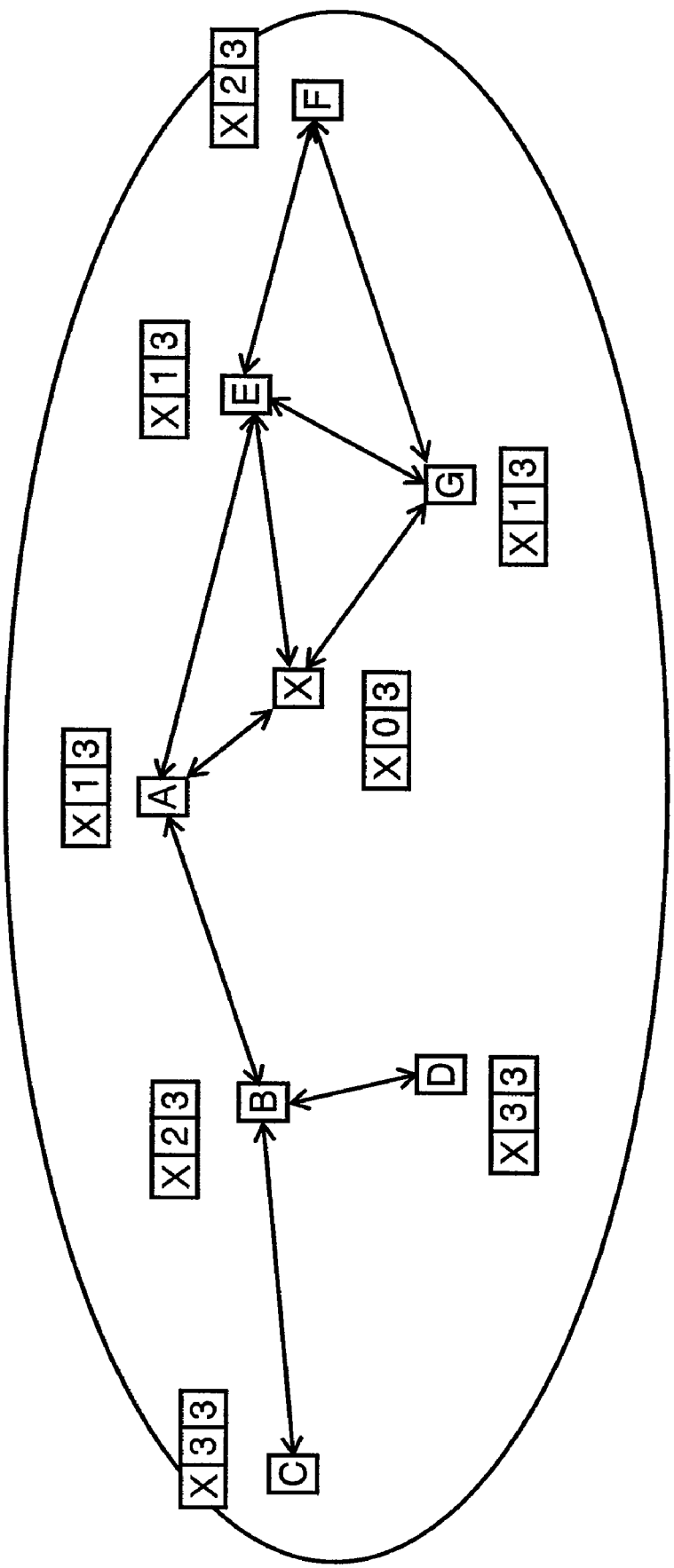
FIG. 12 is illustrates network operation performed by each wireless communication device, according to the embodiment of the present invention.

Next, in FIG. 12, nodes F, G update the recorded maximum hop count to '3' according to information in the measurement frame received from nodes X, E. Herewith, the maximum hop count eventually becomes '3' at every node. Since then, the steady state continues as long as the network topology remains unchanged.

When the values of the maximum MAC address, hop count, and maximum hop count enter a steady state as described above, the value of the maximum hop count retained in each node becomes the same. This value is a hop count from a unique node (node with the maximum MAC address, in this embodiment) to the farthest node with its number of hops maximized.

Here, the hop count from a unique node (assumed to be "max") to the farthest node is assumed to be hmax, and H(x,y) is assumed to be the hop count between x and y, where $\exists G$, $\forall a, \forall b \in G$. Then, the following inequality holds.

$$H(a,b) \leq H(a,\max) + H(\max,b) \leq 2*h\max$$

That is, the maximum hop count out of those relayed from an arbitrary node to another arbitrary one is to be limited by 2*hmax, where a, b indicate arbitrary nodes. Furthermore, hmax≦max(H(a,b)), which means hmax includes at most an error expressed by the next relational expression.

$$\max(H(a,b)) \leq 2*h\max \leq 2*\max(H(a,b))$$

Consequently, information transmitted from a node is propagated by relaying to all the other nodes in the group in at least 2*hmax.

In the example of the wireless network according to the embodiment, hmax is '3' in FIG. 12, which means information is assuredly delivered to all the members in at least 2*3=6. Actually, however, a value of 4 hops is the maximum hop count from an arbitrary node to another arbitrary one in this group.

From the above, by showing a measurement field a mechanism for determining the number of hops required to advertise to the entire group, advertising to the entire group can be performed with a small amount of transmission resources.

Next, a description is made for the operation in a case where the network topology changes such as when a node in the same group moves. Such changes in topology include a case where a value such as a hop count and maximum hop count determined by the maximum MAC address changes when a node advertising the maximum MAC address is excluded from the group or goes down. Another case occurs when a path for counting the hop count disappears or when a node advertising the maximum MAC address is excluded from the group or goes down.

In order to dynamically respond to such events, namely changes in topology, lifetime information is provided in measurement field 201. More specifically, the lifetime indicates an effective period of information, and information in an old measurement frame is deleted by timeouting with the lifetime. In the present invention, however, information is transmitted by hop-by-hop relay method, and thus transmission of information must not be timeouted with a lifetime set, within a time required to transmit to a node farthest from that with the maximum MAC address. Meanwhile, an excessively long lifetime is not preferable because it cannot promptly respond to changes in topology. Accordingly, beacon transmission instructing unit 108 of a node determines lifetime 212 of a maximum MAC address using expression (1).

$$\text{lifetime} = (\text{time required for 1-hop relaying}) * (h\max + n) \qquad (1),$$

where n is a constant (e.g. approximately '5').

Herewith, hmax is the maximum value of the hop count from a node with the maximum MAC address in a steady state, and thus transmission to all the group members is assured. An additional node is supported because the lifetime does not become zero while the number of hops to the node is within the constant n.

Figure 13:
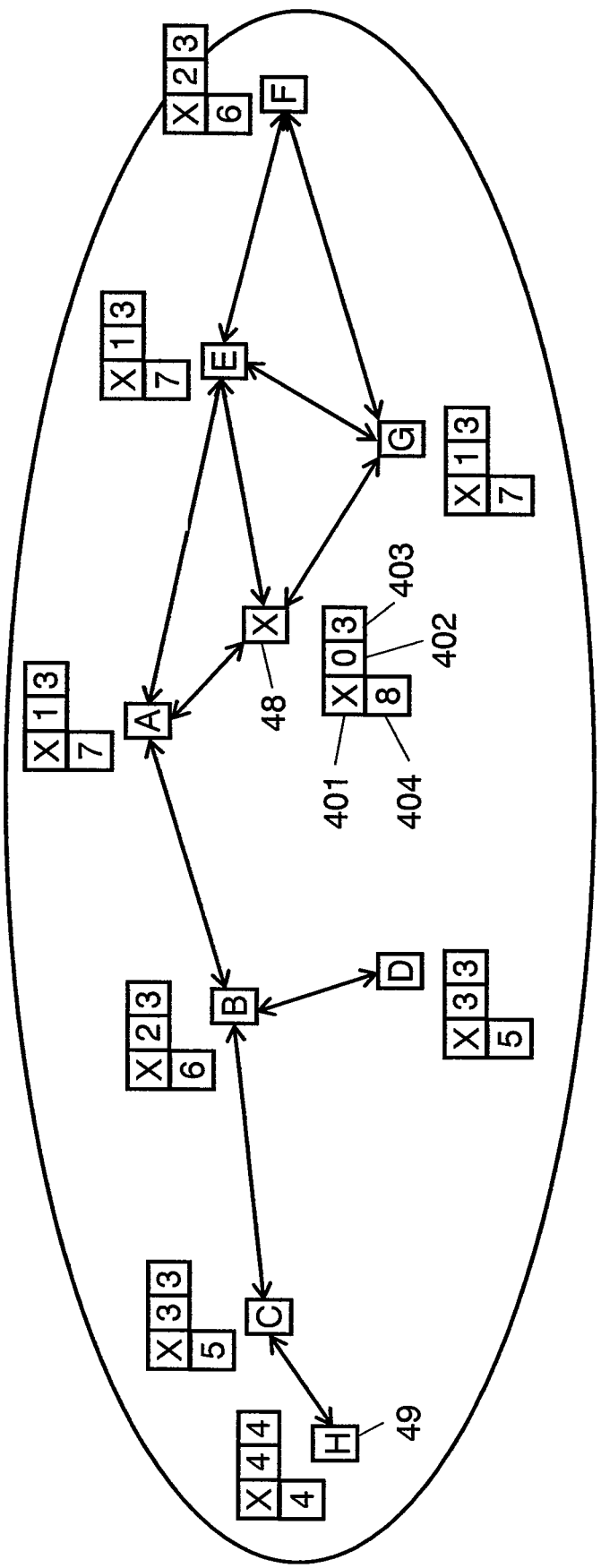
FIG. 13 is illustrates network operation performed by each wireless communication device, according to the embodiment of the present invention.
Figure 14:
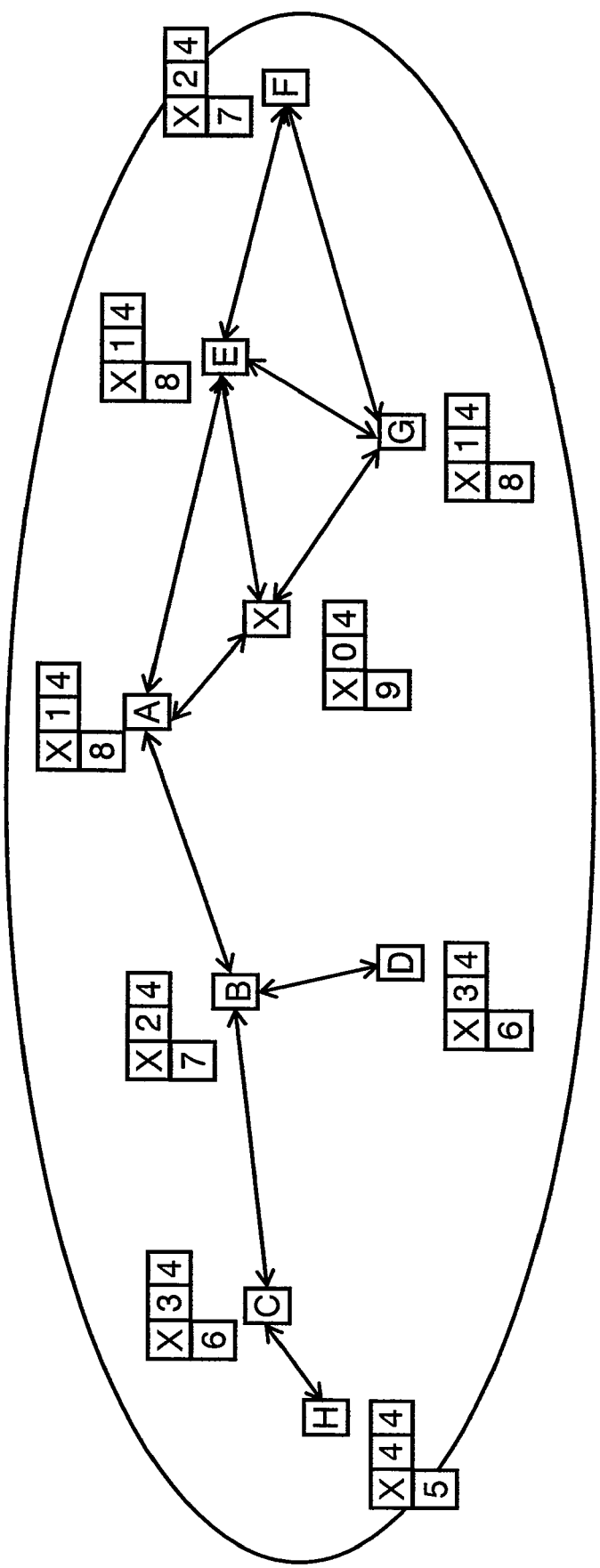
FIG. 14 is illustrates network operation performed by each wireless communication device, according to the embodiment of the present invention.

FIGS. 13, 14 illustrate a state in which node H(49) is added to a position farthest from node X(48) with the maximum MAC address. Here, four pieces of data 401 through 404 written to node X(48) show a maximum MAC address, hop count, maximum hop count, and lifetime, respectively. This notational convention applies to the other nodes as well.

In FIG. 13, node X(48) sets 8 (=3+5) to the lifetime, assuming the time required for 1-hop relaying is '1', and thus node H receives the lifetime as '5'. After that, as shown in FIG. 14, the maximum number of hops is propagated from node H to all the other nodes. Node X(48) with the maximum MAC address, when receiving this notice, updates the lifetime to 9 (=4+5), and after then transmits a measurement frame. This allows responding to a new node added again.

Next, a description is made for a case where combination is made with another large group as a whole.

In this case, propagation can fail with a lifetime set according to the above-described expression (1). Such a case can be supported by further adding (time required for 1-hop relaying)*n to the lifetime in a measurement frame transmitted from a node with the maximum MAC address.

Figure 15:
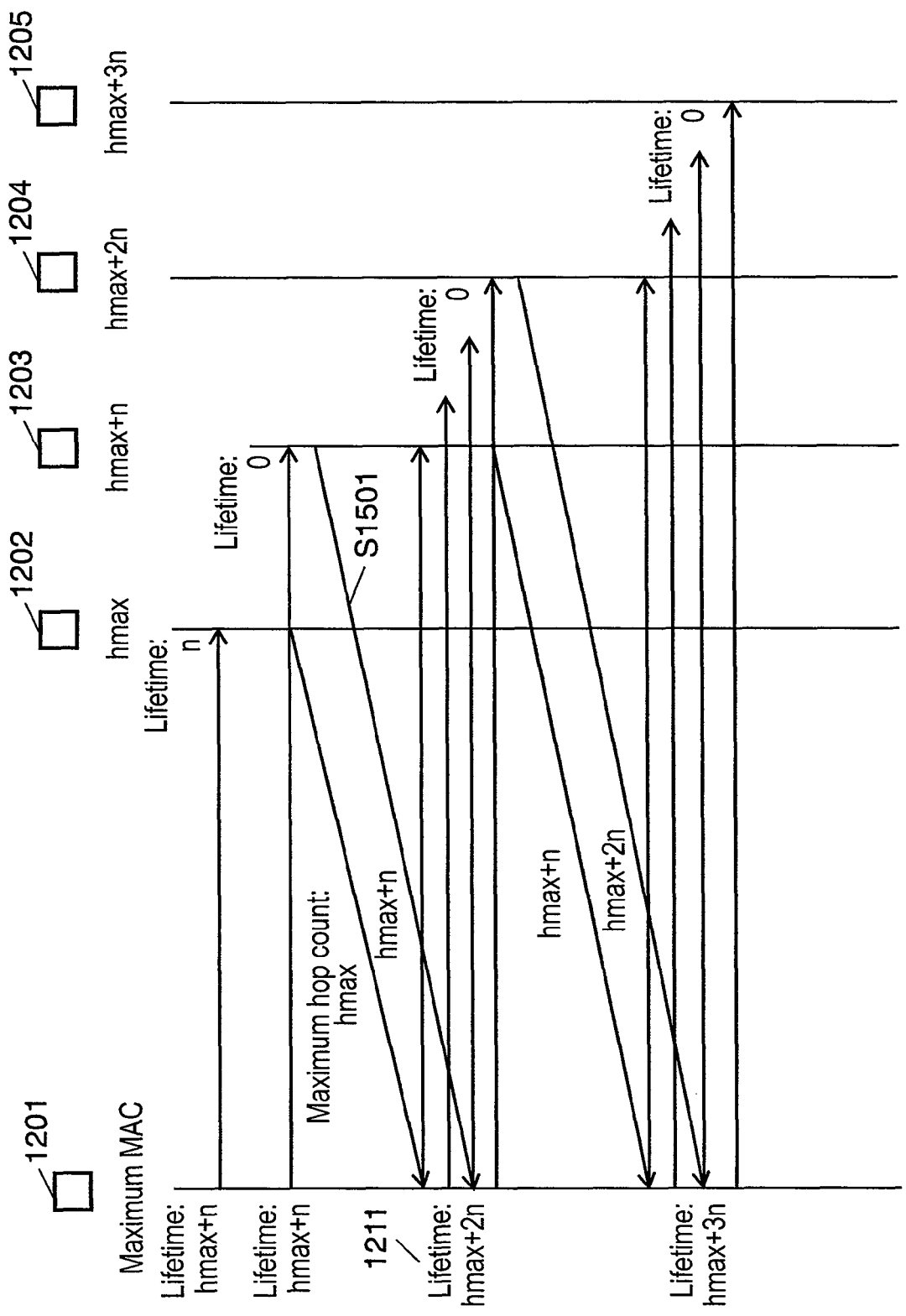
FIG. 15 illustrates a state of propagation when the wireless communication network, according to the embodiment of the present invention changes.

FIG. 15 illustrates a state of propagation at this moment. Here, assumption is made that the time required for 1-hop relaying is '1', and nodes 1203 through 1205 have joined the network group to which nodes 1201, 1202 belong.

In FIG. 15, node 1202 is positioned a time of hmax away from node 1201 with the maximum MAC address; node 1203, hmax+n; node 1204, hmax+2 n; and node 1205, hmax+3 n.

Node 1203, because the remaining lifetime 212 of the maximum MAC address becomes '0', notifies node 1201 that the lifetime has elapsed (the maximum hop count is hmax+n) (step S1501).

Node 1201, responding to this notice, transmits a measurement frame with lifetime 212 of the maximum MAC address being time (1211) of ((hmax+n)+n=hmax+2 n). Repeating this process enables a measurement frame to be propagated to node 1205. Eventually, the maximum hop count updated can be propagated to all the nodes in the group added.

In the above-described method, however, propagation of information is interrupted before node 1201 with the maximum MAC address receives information for notifying that the remaining lifetime of the maximum MAC address has become '0'. In other words, the maximum number of hops continues to grow while temporarily stopping at hmax+n, hmax+2 n, etc.

Figure 16:
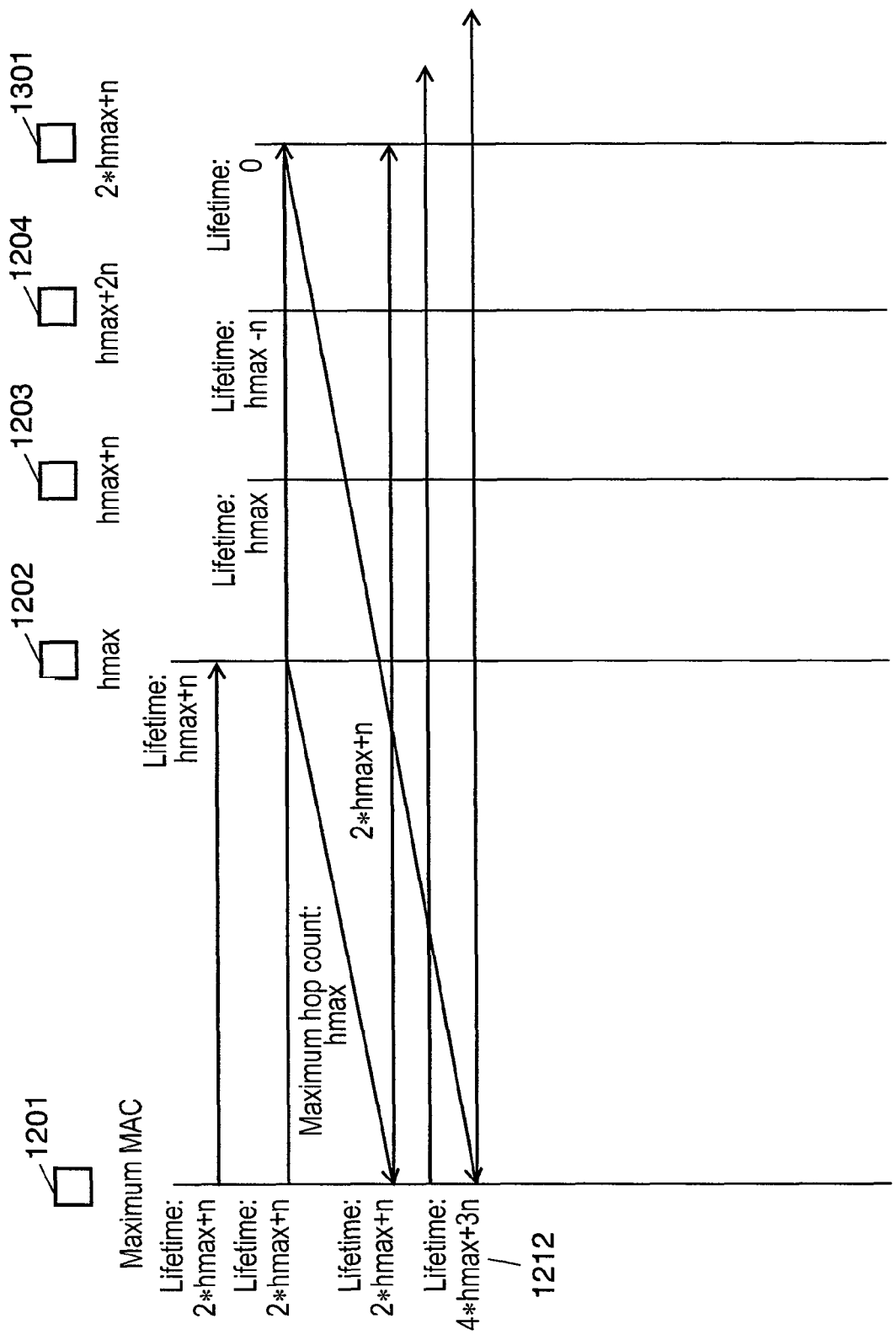
FIG. 16 illustrates a state of propagation when the wireless communication network, according to the embodiment of the present invention changes.

FIG. 16 illustrates a state of propagation with the lifetime incremented by hmax. Here, assumption is made that the time required for 1-hop relaying is '1'. In this case, the lifetime is a time of (m*hmax+n), where m=2, 3, etc.

In FIG. 16, node 1201 with the maximum MAC address sets (2*hmax+n) to lifetime 212 of the maximum MAC address to transmit a measurement frame. As a result that the number of nodes in the group rapidly increases as shown in FIG. 13, the first measurement frame is transmitted to node 1301 as well positioned a time of (2hmax+n) away. Then, node 1201, when notified of the maximum hop count (2hmax+n) from node 1301, transmits a measurement frame with lifetime 212 of the maximum MAC address being time (1212) of (2*(2hmax+n)+n=4*hmax+3n). Repeating this process enables node 1201 with the maximum MAC address to respond to a case where the number of nodes in the group rapidly increases.

The lifetime is thus preferably set to (time required for 1-hop relaying)*(k+n), where k is a maximum hop count (hmax) and n is a constant, when the network is in a contracted or steady state; and (time required for 1-hop relaying)*(mk+n), where m and n are constants and k is hmax, when the network is expanding. This is because an optimum lifetime can be always specified that dynamically responds to expansion/contraction of the network gradually changing.

The state is judged steady or expanding by whether the maximum hop count updated as needed is updated more often than once per two cycles. This is because it takes two cycles to update the maximum hop count when the network is expanding.

The above description is for a method of determining the lifetime of the maximum MAC address, set by beacon transmission instructing unit 108; and the lifetime to be set to sequence number 212, set by a node with the maximum MAC address.

Next, a description is made for the lifetime of maximum hop count information that beacon transmission instructing unit 108 sets to the lifetime and sequence number 215 of the maximum hop count.

The lifetime of this maximum hop count information is determined by the next expression.

$$\text{lifetime}=(\text{time required for 1-hop relaying})*(m*h\text{max})+n \qquad (2)$$

Here, if m is 2 and n is 0, this expression applies to a case where the number of nodes is in a steady state and is increasing. This is because the maximum hop count is assuredly propagated to all the nodes in the same group because 2*hmax is larger than the maximum value of the hop count between arbitrary two addresses.

In an expanding state, nodes in the same group that maximum hop count information does not reach is positioned hmax (hop count) or more away from a node with the maximum MAC address, and thus these nodes updates the maximum hop count. Here, assuming that mhc is a node transmitting the maximum hop count, the relationship between the maximum hop count (hmax) and the number of hops H(a, mhc) from node (a) to node (mhc) with the maximum MAC address is as follows.

For $\forall a: H(a,mhc) \geq 2*h\text{max}$, $2*h\text{max} \leq H(a,mhc) \leq H(\text{max},mhc)+H(a,\text{max})$ $2*h\text{max} \leq h\text{max}+H(a,\text{max})$ namely, $h\text{max} \leq H(a,\text{max})$ Consequently, a node hmax or more away from the node with the maximum MAC address does not need to be advertised because it is in an area where the maximum hop count, even if advertised, is not updated.

Using a sequence number to be set to the lifetime and sequence number 212 of the maximum MAC address and the lifetime and sequence number 215 of the maximum hop count prevents new information from being updated to old information that has already passed through the self node.

Figure 17A:
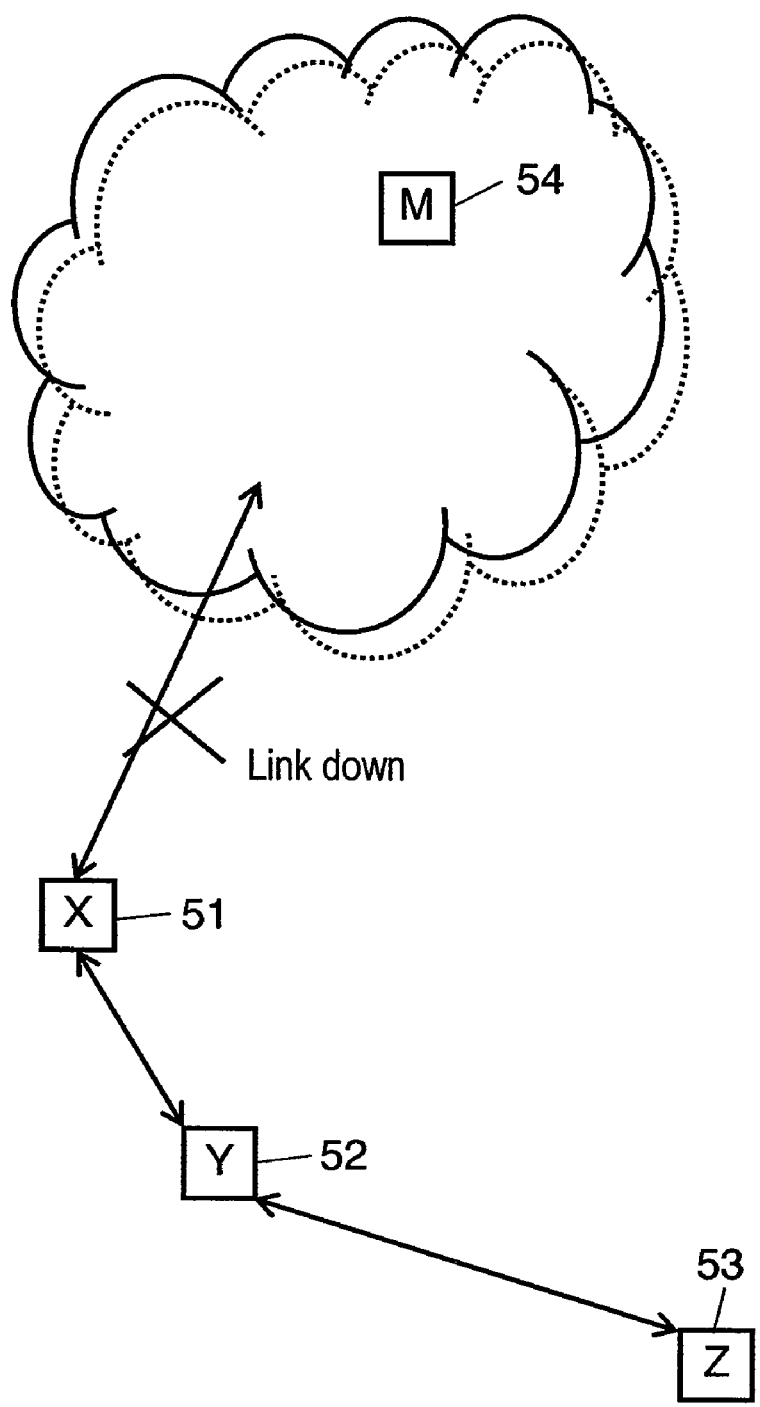
FIG. 17A illustrates an arrangement of plural nodes belonging to a network, according to the embodiment of the present invention.
Figure 19:
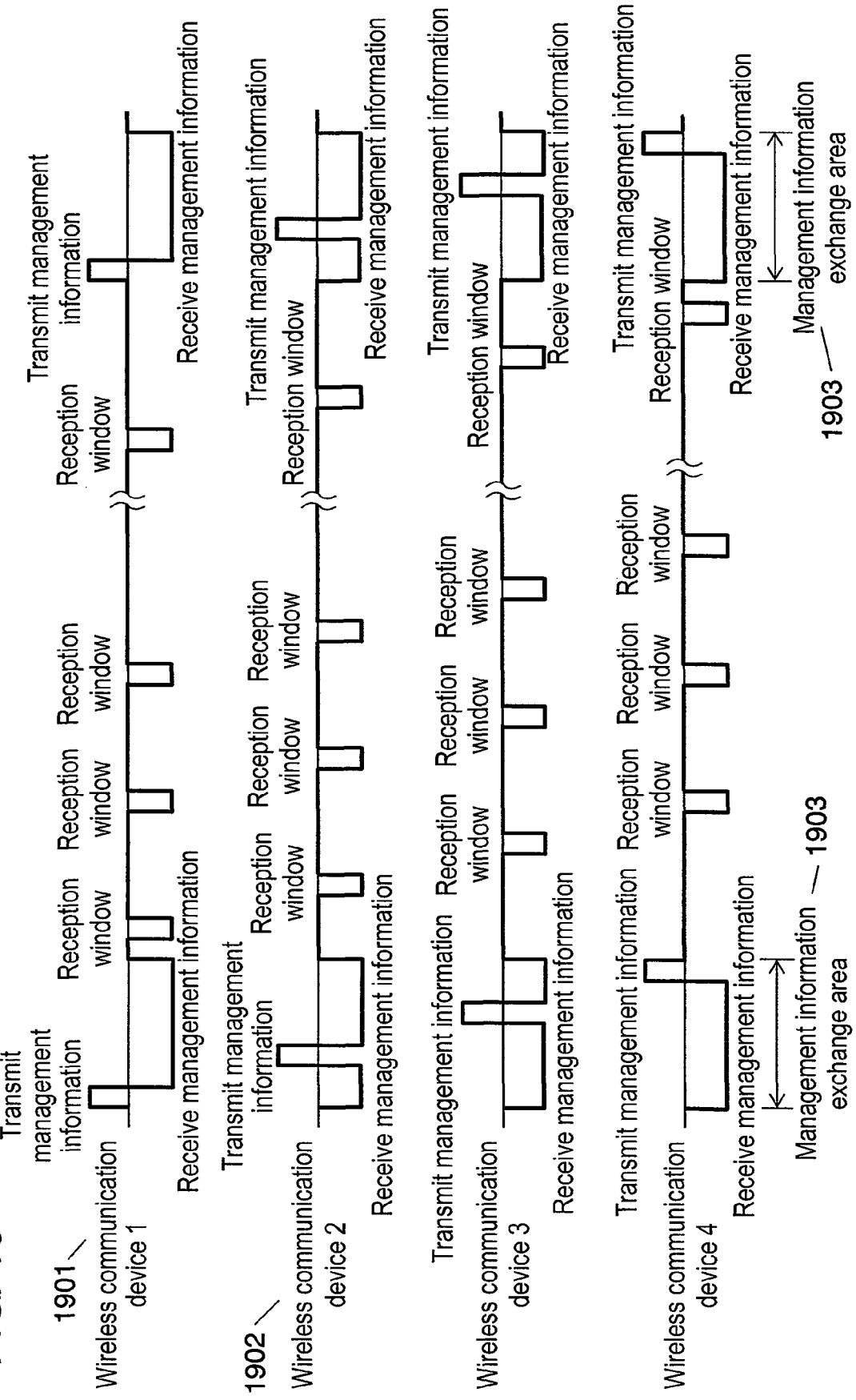
FIG. 19 illustrates a wireless communication method according to a conventional example.

FIG. 17A illustrates an arrangement of plural nodes belonging to the same network. FIG. 17B illustrates transition of the maximum MAC address, hop count, and sequence number of each node.

In FIG. 17A, nodes X(51), Y(52), Z(53) positioned at the end of a group are assumed to be arranged in a line. Then, in initial state 1701, the hop counts of nodes X, Y, Z are retained in the nodes as X:5, Y:6, Z:7, respectively. Next, if the link has been disconnected between node X and its upstream node M in second information exchange 1702, node X ignores it if advertisement of node Y is earlier than that of node X in third information exchange 1703. This is because the sequence number of node Y is '22', which is smaller, namely older, than '23' of node X. This method prevents a problem in which the hop count of node X is updated to that of node Y in third information exchange 1801, and since then nodes X, Y, Z share old information as in a case where a measurement frame without its sequence number as shown in FIG. 18 is used. This prevents nodes X, Y, Z from continuing to count up the hop count as long as the lifetime remains.

In this embodiment, a unique node is determined as a node with the maximum MAC address, but not limited. A unique node may be a node with the minimum MAC address or a node closer to a specific MAC address. Processing in the same way results in the same effect with these unique nodes as well.

As described above, according to this embodiment, information for measuring the group size, received by each node is successively compared with that for measuring, retained, and information to be the maximum hop count is retransmitted to propagate the maximum hop count to all the nodes in the group. This allows each node to estimate the number of hops or the number of superframes required for information to be propagated in the entire group.

INDUSTRIAL APPLICABILITY

The present invention is useful for a communication method and communication device, particularly for a wireless communication device, when performing ad-hoc communication and the like, and suitable for acquiring a period of time during which certain protocol data assuredly reaches all the wireless communication devices in the same group.

The invention claimed is:

1. A communication method in an ad-hoc network in which a plurality of communication devices perform ad-hoc communication, comprising:
   a step in which the communication devices determine a unique communication device in the ad-hoc network;
   a step in which the communication devices measure hop counts from the unique communication device; and
   a step in which the communication devices propagate a maximum hop count out of the hop counts, in the ad-hoc network,
   wherein the communication device periodically transmits specific information, in a range communicatable by the communication device,
   wherein the specific information includes an identifier specifying a communication device, a hop count from the unique communication device, and a lifetime formed by unifying a lifetime of the information on the identifier and a lifetime of the information on the hop count,
   wherein the step for determining the unique communication device includes:
      a step in which a communication device compares a self identifier as an initial value of an identifier to an identifier received from an other communication device, and selects an identifier larger, smaller, or closer to a specific value; and
      a step in which the communication device retains information on the identifier selected, and transmits the information to an other communication device,
   wherein the step for measuring the hop count includes:
      a step in which the unique communication device transmits a hop count included in the specific information starting with '0';
      a step in which a communication device, when receiving the specific information, adds a given number of hops to the hop count;
      a step in which a communication device compares the hop count with a given number of hops added, to information on a hop count from the unique communication device, retained until then, and selects a smaller hop count; and
      a step in which the communication device updates information on the hop count included in the specific information, to the hop count selected, and transmits the information to an other communication device, and
   wherein the communication device deletes the information on the identifier and the information on the hop count when the lifetime timeouts,
   wherein the specific information include a maximum hop count, and
   wherein the step for propagating a maximum hop count out of the hop counts retained by the communication devices, in an ad-hoc network includes:
      a step for selecting a maximum hop count out of a hop count from the unique communication device, obtained by a communication device in the step for measuring; the maximum hop count received; and information on the maximum hop count retained until then; and
      a step for updating information on a maximum hop count to a hop count selected by a communication device, for retaining the information, and for transmitting the information to an other communication device,
   wherein the specific information further includes a lifetime indicating a time of validity of the specific information,
   wherein an initial value of the lifetime is given by a communication device that is transmitting a maximum hop count, and
   wherein information on the maximum hop count is deleted when the lifetime timeouts,
   wherein the lifetime is given by (time required for 1-hop relaying)*(k+n), assuming that k is a value of the maximum hop count and n is a constant.

2. A communication method in an ad-hoc network in which a plurality of communication devices perform ad-hoc communication, comprising:
   a step in which the communication devices determine a unique communication device in the ad-hoc network;
   a step in which the communication devices measure hop counts from the unique communication device; and
   a step in which the communication devices propagate a maximum hop count out of the hop counts, in the ad-hoc network,
   wherein the communication device periodically transmits specific information, in a range communicatable by the communication device,
   wherein the specific information includes an identifier specifying a communication device, a hop count from the unique communication device, and a lifetime formed by unifying a lifetime of the information on the identifier and a lifetime of the information on the hop count,
   wherein the step for determining the unique communication device includes:
      a step in which a communication device compares a self identifier as an initial value of an identifier to an identifier received from an other communication device, and selects an identifier larger, smaller, or closer to a specific value; and
      a step in which the communication device retains information on the identifier selected, and transmits the information to an other communication device, wherein the step for measuring the hop count includes:
- a step in which the unique communication device transmits a hop count included in the specific information starting with '0';
- a step in which a communication device, when receiving the specific information, adds a given number of hops to the hop count;
- a step in which a communication device compares the hop count with a given number of hops added, to information on a hop count from the unique communication device, retained until then, and selects a smaller hop count; and
- a step in which the communication device updates information on the hop count included in the specific information, to the hop count selected, and transmits the information to an other communication device, and wherein the communication device deletes the information on the identifier and the information on the hop count when the lifetime timeouts, wherein the specific information include a maximum hop count, and wherein the step for propagating a maximum hop count out of the hop counts retained by the communication devices, in an ad-hoc network includes:
- a step for selecting a maximum hop count out of a hop count from the unique communication device, obtained by a communication device in the step for measuring; the maximum hop count received; and information on the maximum hop count retained until then; and
- a step for updating information on a maximum hop count to a hop count selected by a communication device, for retaining the information, and for transmitting the information to an other communication device, wherein the specific information further includes a lifetime indicating a time of validity of the specific information, wherein an initial value of the lifetime is given by a communication device that is transmitting a maximum hop count, and wherein information on the maximum hop count is deleted when the lifetime timeouts, wherein the lifetime is given by (time required for 1-hop relaying)*(mk+n), assuming that k is a value of the maximum hop count, and n and m are constants.

3. A communication method in an ad-hoc network in which a plurality of communication devices perform ad-hoc communication, comprising:
- a step in which the communication devices determine a unique communication device in the ad-hoc network;
- a step in which the communication devices measure hop counts from the unique communication device; and
- a step in which the communication devices propagate a maximum hop count out of the hop counts, in the ad-hoc network, wherein the communication device periodically transmits specific information, in a range communicatable by the communication device, wherein the specific information includes an identifier specifying a communication device, a hop count from the unique communication device, and a lifetime formed by unifying a lifetime of the information on the identifier and a lifetime of the information on the hop count, wherein the step for determining the unique communication device includes:
- a step in which a communication device compares a self identifier as an initial value of an identifier to an identifier received from an other communication device, and selects an identifier larger, smaller, or closer to a specific value; and
- a step in which the communication device retains information on the identifier selected, and transmits the information to an other communication device, wherein the step for measuring the hop count includes:
- a step in which the unique communication device transmits a hop count included in the specific information starting with '0';
- a step in which a communication device, when receiving the specific information, adds a given number of hops to the hop count;
- a step in which a communication device compares the hop count with a given number of hops added, to information on a hop count from the unique communication device, retained until then, and selects a smaller hop count; and
- a step in which the communication device updates information on the hop count included in the specific information, to the hop count selected, and transmits the information to an other communication device, and wherein the communication device deletes the information on the identifier and the information on the hop count when the lifetime timeouts, wherein the specific information include a maximum hop count, and wherein the step for propagating a maximum hop count out of the hop counts retained by the communication devices, in an ad-hoc network includes:
- a step for selecting a maximum hop count out of a hop count from the unique communication device, obtained by a communication device in the step for measuring; the maximum hop count received; and information on the maximum hop count retained until then; and
- a step for updating information on a maximum hop count to a hop count selected by a communication device, for retaining the information, and for transmitting the information to an other communication device, wherein the specific information further includes a lifetime indicating a time of validity of the specific information, wherein an initial value of the lifetime is given by a communication device that is transmitting a maximum hop count, and wherein information on the maximum hop count is deleted when the lifetime timeouts, wherein the lifetime is given by (time required for 1-hop relaying)*(k+n)

when the ad-hoc network is in a contracting or steady state, and (time required for 1-hop relaying)*(mk+n)

when the ad-hoc network is in a expanding state, assuming that k is a value of the maximum hop count, and n and m are constants.

4. The communication method of claim 3, wherein the ad-hoc network is judged to be in an expanding state if a communication device receives the specific information that increases the maximum hop count at least once during a period twice a cycle during which the communication device communicates specific information periodically, and to be in a contracting or steady state otherwise.

5. The communication method of claim 1, including:

a step for recording an identifier of a communication device as a transmission origin of the specific information when a communication device updates an identifier of the unique communication device, a hop count from the unique communication device, and the maximum hop count, respectively; and a step for unconditionally updating an identifier of the unique communication device, a hop count from the unique communication device, and information on the maximum hop count when receiving the specific information from a communication device identified by the identifier recorded.

6. The communication method of claim 5, wherein the specific information further includes sequence numbers given to an identifier of the unique communication device, to a hop count from the unique communication device, and to the maximum hop count, respectively, and wherein the sequence number included in the specific information received is invalidated if smaller than the sequence number retained a self.

7. The communication method of claim 6, wherein a sequence number given to an identifier of the unique communication device and a sequence number given to the maximum hop count are unified.

* * * * *